US006744866B1

(12) United States Patent
Nolting et al.

(10) Patent No.: US 6,744,866 B1
(45) Date of Patent: Jun. 1, 2004

(54) TRAFFIC TRACK USAGE MEASUREMENT SYSTEM

(75) Inventors: Thomas A. Nolting, Holliston, MA (US); Richard LaPearl, Princeton, MA (US); Sheila Noonan, Falmouth, MA (US); Karen Dion, Dudley, MA (US); Raymond X. Leung, Mendon, MA (US)

(73) Assignee: Verizon Services Corp., Arlington, VA (US)

( * ) Notice: Subject to any disclaimer, the term of this patent is extended or adjusted under 35 U.S.C. 154(b) by 898 days.

(21) Appl. No.: 09/188,712

(22) Filed: Nov. 10, 1998

Related U.S. Application Data

(63) Continuation-in-part of application No. 09/048,102, filed on Mar. 26, 1998.

(51) Int. Cl.$^7$ ............................ H04M 15/00; H04M 1/24
(52) U.S. Cl. ............. 379/133; 379/112.01; 379/112.06; 379/114.01; 379/114.28; 379/115.01; 379/121.01; 379/134; 379/32.01
(58) Field of Search ................................. 379/112, 113, 379/133, 134, 34, 111, 114, 115, 121, 126

(56) References Cited

U.S. PATENT DOCUMENTS

| | | | |
|---|---|---|---|
| 4,456,788 A | | 6/1984 | Kline et al. |
| 4,464,543 A | | 8/1984 | Kline et al. |
| 4,760,594 A | | 7/1988 | Reed |
| 4,788,718 A | | 11/1988 | McNabb et al. |
| 5,008,929 A | | 4/1991 | Olsen et al. |
| 5,285,494 A | | 2/1994 | Sprecher et al. ............... 379/59 |
| 5,333,183 A | * | 7/1994 | Herbert ........................ 379/112 |
| 5,359,649 A | * | 10/1994 | Rosu et al. .................. 379/113 |

(List continued on next page.)

OTHER PUBLICATIONS

"Gentia Software, Section 3: Query and Reporting Tools", by META Group, Inc., *Data Warehousing Tools Bulletin* (Aug. 1997); pp, 3615–3620.

Hewlett Packard 1991 "Test & Measurement Catalog", entitled "Data Communications Test Equipment", p. 567.

Hewlett Packard Brochure entitled "Unlock the secrets of Signaling System No. 7—fast", HP 37900B and 37900C Signaling Test Sets.

(List continued on next page.)

*Primary Examiner*—Curtis Kuntz
*Assistant Examiner*—Quoc Tran
(74) *Attorney, Agent, or Firm*—Leonard C. Suchyta, Esq.; Joeseph Copolla, Esq.

(57) ABSTRACT

A monitoring system captures and processes messages from SS7 links, to compile call detail records (CDRs) for all interoffice call attempts. The CDRs are uploaded into a relational database. Automatic Message Accounting (AMA) records also are accumulated and uploaded to a another relational database. A data preparation operation utilizes external information to enhance the records for further processing, for example, to translate information codes in the records to textual names of originating and terminating offices. The enhanced records are loaded into a multi-dimensional database. The multi-dimensional database software facilitates analysis of the records to identify a variety of network traffic patterns. The user can automatically set up and customize studies for particular applications, for example to study traffic patterns for calls through a particular office. The multi-dimensional database also enables the presentation of information from the records in formats illustrating a variety of particular features of the traffic found in a study. For example, a report may show minutes of use for calls through an office during different hours of the day or show the other offices communicating with the office under study and the numbers of calls from each of those other offices.

31 Claims, 6 Drawing Sheets

U.S. PATENT DOCUMENTS

| | | | | |
|---|---|---|---|---|
| 5,425,087 A | | 6/1995 | Gerber et al. | |
| 5,434,845 A | | 7/1995 | Miller | |
| 5,438,570 A | * | 8/1995 | Karras et al. | 379/133 |
| 5,457,729 A | | 10/1995 | Hamann et al. | 379/2 |
| 5,475,732 A | | 12/1995 | Pester, III | |
| 5,483,590 A | * | 1/1996 | Chiu et al. | 379/269 |
| 5,563,930 A | | 10/1996 | Pester, III | |
| 5,579,371 A | * | 11/1996 | Aridas et al. | 379/34 |
| 5,592,530 A | * | 1/1997 | Brockman et al. | 379/34 |
| 5,642,396 A | | 6/1997 | Cowgill | |
| 5,692,181 A | | 11/1997 | Anand et al. | |
| 5,712,908 A | * | 1/1998 | Brinkman et al. | 379/119 |
| 5,715,294 A | | 2/1998 | Pester, III | |
| 5,724,584 A | * | 3/1998 | Peters et al. | 379/119 |
| 5,737,399 A | | 4/1998 | Witzman et al. | |
| 5,757,895 A | * | 5/1998 | Aridas et al. | 379/112 |
| 5,768,352 A | * | 6/1998 | Elliott et al. | 379/112 |
| 5,774,530 A | | 6/1998 | Montgomery et al. | |
| 5,793,839 A | | 8/1998 | Farris et al. | |
| 5,802,145 A | | 9/1998 | Farris et al. | |
| 5,809,120 A | | 9/1998 | Montgomery et al. | |
| 5,825,769 A | | 10/1998 | O'Reilly et al. | |
| 5,828,729 A | | 10/1998 | Clermont et al. | |
| 5,835,583 A | | 11/1998 | Hetz et al. | 379/220 |
| 5,838,682 A | | 11/1998 | Dekelbaum et al. | |
| 5,838,769 A | | 11/1998 | McNeil et al. | |
| 5,838,796 A | | 11/1998 | Mittenthal | |
| 5,844,981 A | | 12/1998 | Pitchford et al. | |
| 5,850,426 A | | 12/1998 | Watkins et al. | 379/29 |
| 5,852,819 A | | 12/1998 | Beller | |
| 5,854,834 A | | 12/1998 | Gottlieb et al. | 379/113 |
| 5,854,835 A | | 12/1998 | Montgomery et al. | |
| 5,864,608 A | | 1/1999 | Brownmiller et al. | 379/113 |
| 5,867,558 A | | 2/1999 | Swanson | |
| 5,867,565 A | | 2/1999 | Morikawa | |
| 5,875,238 A | * | 2/1999 | Glitho et al. | 375/116 |
| 5,881,140 A | | 3/1999 | Gerault et al. | |
| 5,896,445 A | | 4/1999 | Kay et al. | |
| 5,901,208 A | | 5/1999 | Jabbarnezhad | |
| 5,905,785 A | | 5/1999 | Dunn et al. | |
| 5,905,985 A | | 5/1999 | Malloy et al. | |
| 5,907,603 A | | 5/1999 | Gallagher et al. | |
| 5,917,898 A | | 6/1999 | Bassa et al. | 379/133 |
| 5,933,490 A | | 8/1999 | White et al. | |
| 5,937,042 A | | 8/1999 | Sofman | 379/113 |
| 5,940,471 A | * | 8/1999 | Homayoun | 379/34 |
| 5,949,862 A | | 9/1999 | Fukuzawa et al. | 379/113 |
| 5,999,604 A | * | 12/1999 | Walter | 379/133 |
| 6,011,838 A | * | 1/2000 | Cox | 379/113 |
| 6,052,447 A | | 4/2000 | Golden et al. | |
| 6,052,448 A | | 4/2000 | Janning | |
| 6,067,354 A | | 5/2000 | Bauer et al. | 379/113 |
| 6,075,848 A | * | 6/2000 | Lunn et al. | 379/113 |
| 6,078,647 A | | 6/2000 | D'Eletto | |
| 6,112,238 A | * | 8/2000 | Boyd et al. | 709/224 |
| 6,141,412 A | * | 10/2000 | Smith et al. | 379/265 |

OTHER PUBLICATIONS

Hewlett Packard Brochure entitled "GSM Signaling Test System", HP 37900 Product Note–1.

"Can you afford to be without SS7 network surveillance?" by Rex R. Hester, Telephony, Dec. 3, 1990.

"Telecommunications", International Edition, vol. 23, No. 8, Aug. 1989.

Article entitled "Test and Measurement Techniques for GSM", from Telecommunications, Dec. 1989 issue.

Hewlett Packard Brochure entitled "HP 37900A and 37900B Signaling Test Sets", Technical Data for "Get the best from Signaling System No. 7".

Hewlett Packard Brochure entitled "Wide area networking protocol analysis solutions for the long run." re HP 4954A wide area network protocol analyzer, 1987.

Article entitled "ASQIC 800 Call Data Master", published in AT&T Technical Journal, pp. 21–31, May/Jun. 1987, vol. 66, Issue 3.

Article entitled "By probing your SS7 links, you can gather all sorts of information", published in Wireless Review, May 1, 1998.

Press Release entitled "Inet Technologies Reports Record Revenues for Eleventh Consecutive Quarter" dated Jan. 25, 2001.

"Investor Relations FAQs" published by Inet Technologies, Inc., Sep. 7, 2000.

Promotional materials entitled "Network Operations & Maintenance", "IT: seven Revenue Assurance Applications", "Diagnostics", and "IP/SS7 Interoperability" by Inet Technologies, Inc.

Promotional Brochure entitled "GeoProbe Mobile", published by Inet Technologies, Inc.

Promotional materials published by Inet Technologies, Inc. including GeoProbe Service Provider's Competitive Advantage, GeoCare, and 2 press releases.

Inet Technologies Inc. (INTI) Quarterly Report (SEC form 10–Q), dated Aug. 4, 2000.

New Release entitled AT&T to manage international gateway sites with Inet's GeoProbe system:, dated Jan. 26, 1998.

* cited by examiner

TRAFFIC TRACK USAGE MEASUREMENT SYSTEM

CROSS-REFERENCE TO RELATED APPLICATION

This application is a continuation-in-part of U.S. patent application Ser. No. 09/048,102 filed on Mar. 26, 1998 entitled NETWORK PLANNING TRAFFIC MEASUREMENT PROGRAM, the disclosure of which is entirely incorporated herein by reference.

TECHNICAL FIELD

The present invention relates to a method and system for accumulating call specific data for network communication and analyzing that data for a variety of purposes, for example to identify network traffic patterns, to identify specific types of users, etc.

Acronyms

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Advanced Intelligent Network (AIN)
Asynchronous Digital Signal Line (ADSL)
ANswer Message (ANM)
Application Service Part (ASP)
Automatic Message Accounting (AMA)
Automatic Number Identification (ANI)
BellCore AMA Format (BAF)
Carrier Access Billing System (CABS)
Call Processing Record (CPR)
Call Detail Record (CDR)
Carrier Identification Code (CIC)
Centi-Call Second (CCS)
Central Office (CO)
Competitive Local Exchange Carrier (CLEC)
Common Channel Interoffice Signaling (CCIS)
Common Language Location Identifier (CLLI)
Comma Separated Values (CSV)
Customer Record Information System (CRIS)
Destination Point Code (DPC)
End Office (EO)
Engineering and Administrative Data Acquisition System (EADAS)
Executive Information System (EIS)
Fill In Signal Unit (FISU)
First-In, First-Out (FIFO)
Global Title Translation (GTT)
Graphical User Interface (GUI)
HyperText Mark-up Language (HTML)
HyperText Transfer Protocol (HTTP)
Initial Address Message (IAM)
Integrated Service Control Point (ISCP)
Integrated Services Digital Network (ISDN)
ISDN User Part (ISDN-UP or ISUP)
Inter-exchange Carrier (IXC)
Internet Service Provider (ISP)
Landing Zone (LZ)
Line Identification Data Base (LIDB)
Link Service Signaling Unit (LSSU)
Local Exchange Carrier (LEC)
Loop Maintenance Operations Systems (LMOS)
Main Station (MS)
Message Processing Server (MPS)
Message Signaling Unit (MSU)
Message Transfer Part (MTP)
Multi-Dimensional DataBase (MDDB)
Multi-Services Application Platform (MSAP)
Network Administration Center (NAC)
Numbering Plan Area (NPA)
Office Equipment (OE)
Online Analytical Processing (OLAP)
Origination Point Code (OPC)
Operations, Maintenance Application Part (OMAP)
Percentage Internet Usage (PIU)
Personal Computer (PC)
Public Switching Telephone,Network (PSTN)
Release Complete Message (RLC)
Release Message (REL)
Revenue Accounting Office (RAO)
Service Control Point (SCP)
Service Switching Point (SSP)
Signaling Connection Control Part (SCCP)
Signaling Link Selection (SLC)
Signaling System 7 (SS7)
Signaling Point (SP)
Signaling Transfer Point (STP)
Structured Query Language (SQL)
Transaction Capabilities Applications Part (TCAP)
Wide Area Network (WAN)

BACKGROUND ART

An essential problem in optimizing a telecommunications network is balancing equipment and trunking against service and cost. Network design involves predicting future demand based on past results, evaluating the capacity of equipment and facilities, and providing the correct amount of capacity in the proper configuration, in time to meet service objectives. Since virtually every element of a telecommunications system is subject to failure or overload effective testing, monitoring, control, and maintenance is essential to obtain an acceptable level of performance.

Rapid changes and increases in demand for telecommunication services increase the pressures for cost effective engineering and upgrading of the telephone network. Two examples of particular concern relate to Internet access traffic and what is now referred to as "CLEC" traffic.

The sudden increase in popularity of access to the Internet has radically changed the loading placed on the telephone network. Normal voice telephone calls tend to occur at random times, and the network typically routes the majority of such calls to random destinations. Also, the average hold times for such calls tend to be short, e.g. three minutes. By contrast Internet traffic tends to have severe peak traffic times during any given twenty-four hour period, e.g. from 8:00PM to 11:00PM. Also, the network must route Internet access calls to a very small number of destinations, i.e. to the lines for modem pools operated by Internet Service Providers (ISPs). Instead of many parties calling each other randomly, many callers are all calling in to a limited number of service providers. Finally, hold times for Internet calls can last for hours. Some Internet users access the Internet when they sit down at the desk and leave the call connection up until they decide to turn their computers off, e.g. at the end of their day. If they leave their computers on all the time, the connections to the ISPs may stay up for days. These Internet traffic patterns add incredibly heavy traffic loads to the telephone network and tend to concentrate those loads in specific offices providing service to the ISPs.

Another new demand burdening the local exchange carrier (LEC) relates to traffic to and from a competitive local exchange carrier (CLEC). The LEC must provide tandem capacity and trunking to the CLEC exchanges, to carry the new traffic in transit between the two carriers' networks. The CLECs demand that the LEC provide sufficient capacity to minimize blockages on calls to and from the CLEC networks. Disputes also arise over the amount and direction of such traffic, for example, as it relates to billing and compensation issues.

Adding end offices, specialized switching modules, trunks, tandem offices and the like to meet new demands such as those of Internet access and CLEC interconnection requires considerable expense. Accurate engineering, to minimize cost and yet provide effective service to the various customers, becomes ever more essential. To provide effective engineering, it is necessary that the LEC understand the traffic involved. Such understanding requires accurate and complete traffic measurement. Accurate information also is necessary to resolve disputes, for example with the ISPs over service quality or with CLECs over compensation.

U.S. Pat. No. 5,475,732 issued to Eugene Pester Dec. 12, 1995, for Common Channeling Signaling Network Maintenance and Testing, describes an SS7 Network Preventative Maintenance System for detecting potential SS7 and switched network troubles, automatically analyzing the, troubles, and providing alarm and corrective action to avoid major network events. The Pester SS7 Real Time Monitor System described in that patent is a multi-stage SS7 network preventative maintenance tool that detects potential SS7 and switched network troubles, automatically analyzes those troubles, and provides alarm and corrective action instructions to maintenance personnel in time to avoid a major network event. This is accomplished by placing real time SS7 monitors on links at the Signal Transfer Points (STPs).

Information on exceeded Link Load, exceeded Message Signaling Unit (MSU) frequency and Network Management status/error conditions is passed to a Stage 1 controller or process. The Stage 1 process controls link monitors capable of monitoring upwards of 32 link monitors at a single STP. The monitors perform preliminary link analysis on error conditions. If the monitors identify trouble on any of the links, alarm information is sent to a Stage 2 controller or process via the Stage 1 process. The Stage 2 process controls all Stage 1 and associated monitors from an STP pair. If Stage 2 determines that there is an STP pair network trouble, it generates alarm and corrective action information and passes it to the Stage 3 controller or process. The Stage 3 process controls all Stage 2 controllers or processes in the operating company. If Stage 3 determines that there is potential or real company network trouble, it generates alarm and corrective action information and display signals on maintenance terminals in the company's SS7 control center. Stage 3 also alerts the Stage 4 controller process.

U.S. Pat. No. 5,592,530 issued to Brockman et al (Brockman) on Jan. 7, 1997 for Telephone Switch Dual Monitors, relates to testing and monitoring systems for evaluating the operations of telephone switches and more particularly to monitoring systems which are arranged to capture data between nodes of a telephone switching system where the data flows between mated nodes, as in an SS7 common channel signaling network. The Brockman et al. Patent indicates that it is often the case that the messages going from switch A to switch B travel one route on the network, while the messages going from switch B to switch A travel a different route. The network surveillance equipment that monitors the link is designed to capture and correlate as much signaling information as possible regarding network activity. Because of the different paths that messages may take, data relating to a subscriber's phone number may be all in one STP, or split partially in one STP and partially in the other STP of the mated pair "which may be in a different city." Brockman et al. therefore attempt to capture all of the SS7 messages within a mated pair and correlate the fragmented SS7 messages for each monitored call. The system is capable of generating call detail records from the SS7 messages of a mated pair cluster, for use in billing and fraud detection. The Brockman et al. Patent goes on to indicate a need for telephone monitoring systems which enable a user to implement a call trace mechanism, which can track all SS7 messages associated with a particular phone number in order to retroactively trace harassing or obscene phone calls.

While the above discussed Pester and Brockman et al. Patents describe the usefulness of monitors in an SS7 common channel interoffice signaling network for event detection, neither of these patents is directed to the particular problems of traffic measurement addressed by the present invention. The Pester Patent places emphasis on monitoring of the SS7 network itself in order to detect troubles in its functioning. SS7 link monitors are utilized on each SS7 link in the illustrated depiction of that system. The Brockman et al. Patent focuses on monitoring of all links to the STPs in a pair and the assembly of related SS7 signaling messages comprising a record of call completions.

While these methodologies may be effective for their stated purposes there remains a distinct need for an efficient and effective tool for monitoring and analyzing types of traffic through the telephone network. Attempts to use other more traditional approaches, such as the accumulation of data from the switches themselves and the Engineering and Administrative Data Acquisition System (EADAS), fell short of providing the desired information.

It is accordingly an object of th s invention to provide a relatively low cost solution to those problems.

It is another object of the invention to provide a timely, powerful, cost effective means of analyzing traffic on the Public Switching Telephone Network (PSTN).

It is a further object of the invention to provide a flexible, expedient, accurate, and cost effective method to identify individual high usage lines contributing to network blockage.

It is another object of the invention to provide a tandem trunk planning resource which will accommodate future tandem switch growth respondent to customer calling patterns, communities of interest and points of origin and destination.

It is yet another object of the invention to implement Internet Service Provider (ISP) studies and enable better service to ISP customers while maintaining optimal network utilization.

DISCLOSURE OF THE INVENTION

The invention addresses the above stated needs by providing effective techniques for tracking traffic through a telecommunication network. The invention encompasses both methods and apparatus for processing records of calls through the network to develop useful data representing patterns of traffic.

Thus, in one aspect, the invention relates to a method of conducting a study for analyzing traffic through a telecommunication network. The method involves compiling detail records for a predetermined set of calls processed through the telecommunication network. The calls of the set are identified by parameters of the particular study. The method includes steps of loading the detail records into files in a database and processing the files in the database. This data preparation processing prepares the information of the detail records by enriching the information in a manner that facilitates the study.

For example, the data preparation processing may use reference data to translate certain codes in the records into descriptive information, e.g. to identify a serving central office of the network. Another example of the data preparation might be to allocate usage time from each record to appropriate time periods, e.g. to bin the usage time for a call spanning two periods in proper amounts for each period.

This method of the invention also involves uploading the enriched information to an on-line analytical processing routine. An application runs in the on-line analytical processing routine to present study results from the enriched information. The executed application corresponds to the study. In the preferred embodiment, there are a number of predefined applications, for several different types of studies. A user selects and runs the application for the desired type of study.

The preferred embodiment of the on-line analytical processing routine comprises a multi-dimensional database with a presentation layer. The presentation layer may be an independent program or an integral element incorporated in a software package with the multi-dimensional database. The presentation layer provides the user interface, for example in the form of a client-server interface or a web-browser interface. The presentation layer offers the user fast and flexible access to the study data.

In another aspect, the present invention relates to a traffic tracking system, for studying traffic through a telecommunication network. The system includes a database, a data preparation routine and an on-line analytical processing routine. The database receives and stores detail records of selected calls processed through the network. The data preparation routine operates on files in the database, to enrich the detail records in a predetermined manner corresponding to a running study. The on-line analytical processing routine receives the enriched detail records from the data preparation routine. An application, running on the on-line analytical processing routine, processes the enriched call detail records in accord with the study.

The present invention may provide traffic tracking for any of a variety of different types of networks. However, the preferred embodiments track traffic through a switched call processing network, such as a carrier's network of the public switching telephone network. Such a network includes switching offices, providing selective call connections to links serving subscribers. Many such networks produce a variety of messages for normal call processing and/or accounting, which may be monitored or accumulated for use in the traffic tracking studies of the present invention.

The preferred embodiments of the present invention utilize real time monitors on selected SS7 links to collect interoffice signaling messages. A site processor compiles data from the signaling messages relating to individual calls, to form call detail records (CDRs) for all interoffice call attempts. The site processor uploads the CDRs to a central server. Automatic Message Accounting (AMA) records also are accumulated for at least selected central office switching systems and uploaded to a server. The servers maintain two relational databases, one for the CDRs derived from the signaling data, the other for the AMA based call data sets. Data from the two relational databases is processed or, 'prepared' and uploaded to a multi-dimensional database with an associated presentation layer. The multi-dimensional database and presentation layer provide on-line analytical processing tools for enhanced processing of the call data and offers an efficient graphical user interface, preferably a web suite type interface.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIG. 2A is a diagrammatic illustration of the actual switched telephone network and elements of the inventive system used to capture call data from that network. FIG. 2B depicts the data processing elements/software of the traffic tracking system.

DETAILED DESCRIPTION OF THE PREFERRED EMBODIMENTS

The present invention provides techniques for efficient collection, preparation and analysis of traffic data for a communication network. The present invention also encompasses certain specific applications of the traffic tracking technology.

Figure 1:
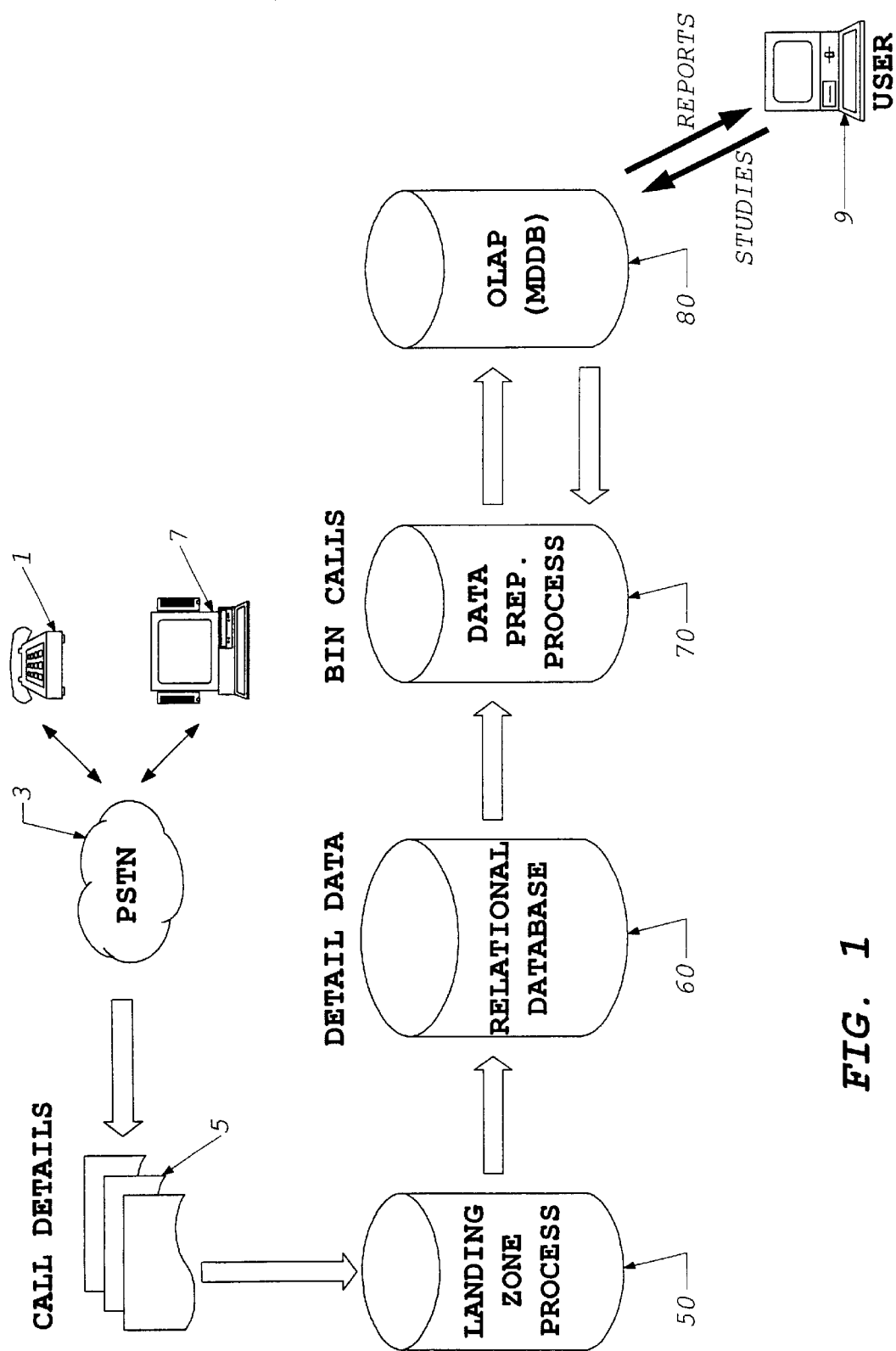
FIG. 1 is a block diagram showing the high-level functional aspects of the present invention.

FIG. 1 provides a high-level illustration of the functions involved. Typically, customers using telephones such as the telephone 1 make calls through the public switching telephone network (PSTN) 3. The PSTN provides switched connections between calling and called stations. In accord with the invention, the network billing equipment and/or certain monitoring equipment in the PSTN 3 accumulates records 5 of the details of the calls. The call detail 5 for each call includes a wide variety of different items of information about the call, including for example calling and called party numbers, the time of the call, the duration of the call if completed, the type of release if terminated without completion, identification of office(s) serving the call, etc. The PSTN 3 accumulates similar call detail records 5 for calls to and from data devices, such as calls from the personal computer (PC) 7 to ISPs discussed later.

The call details 5 are supplied through a database input procedure 50, referred to as a "landing zone". The landing zone serves to format the data and load the call details into appropriate tables in one or more relational databases 60. In the preferred embodiment, the relational database stores call details derived from PSTN billing records and from monitoring of interoffice signaling messages. The relational database 60 stores the bulk detail data in an accessible form. However, still further processing is needed to allow analysis and output of the results in desired aggregate forms. Data from the relational database 60 is prepared and uploaded in process 70 for input for On-Line Analytical Processing (OLAP) 80, which preferably takes the form of a multi-dimensional database (MDDB) with an integrated presentation layer.

The data preparation process 70 summarizes details of calls and categorizes calls into logical groupings. One other function of the data preparation 70 is categorizing calls into "bins" based on the time and duration of the calls. The data preparation process also may involve modifying the call details by application of reference data from other sources, such as profile or service information of one of the parties to the call. The processed call detail information is then uploaded to the OLAP 80.

The OLAP process 80 analyzes the prepared call details and compiles data into reports, for output to a user's terminal 9. The OLAP process provides certain study management tools as well as the user interface. For example, the OLAP system 80 receives the inputs and presents outputs via the user terminal 9, to set up study models, to set-up specific studies using established models and to present study results. As noted, the preferred embodiment of the OLAP software is a multi-dimensional database (MDDB).

The multi-dimensional database (MDDB) 80 captures and stores high level summary data and displays it through the user terminal 9 in a variety of ways. The MDDB enables the user to overlay multiple dimensions when viewing the data, for example, showing originating traffic from one area code generated during certain hours of the day with an average call holding time greater than a specified threshold The preferred MDDB offers the manipulation of data in a cube concept, where data can be approached from many different directions, providing different slices or views of the data. The preferred MDDB also uses a "drilling down" feature to slice or roll-up (aggregate) data based on the metrics (Minutes of Use, Average Holding Time, Busy Hour identification, etc.) required. The drill-down feature enables the user to access the raw call detail information, when necessary. As discussed in more detail later, certain specific applications utilize the MDDB software to provide very specific types of traffic analysis, for example to find Internet Service Providers (ISP's), to find high-volume Internet users, to reconcile CLEC claims regarding transit between the networks, etc.

The present invention therefore provides effective monitoring of various systems of a public telephone network and processing of the data derived from such monitoring, to enable analysis of various patterns of the traffic through the telephone network. In the preferred embodiments, the monitoring involves capture of interoffice signaling messages and accumulation of certain accounting records, relating to interoffice and intra-office telephone calls through the network. To facilitate understanding of the invention, it may be helpful at this point to review the structure and operation of the telephone network, at a relatively high level.

Figure 2A:
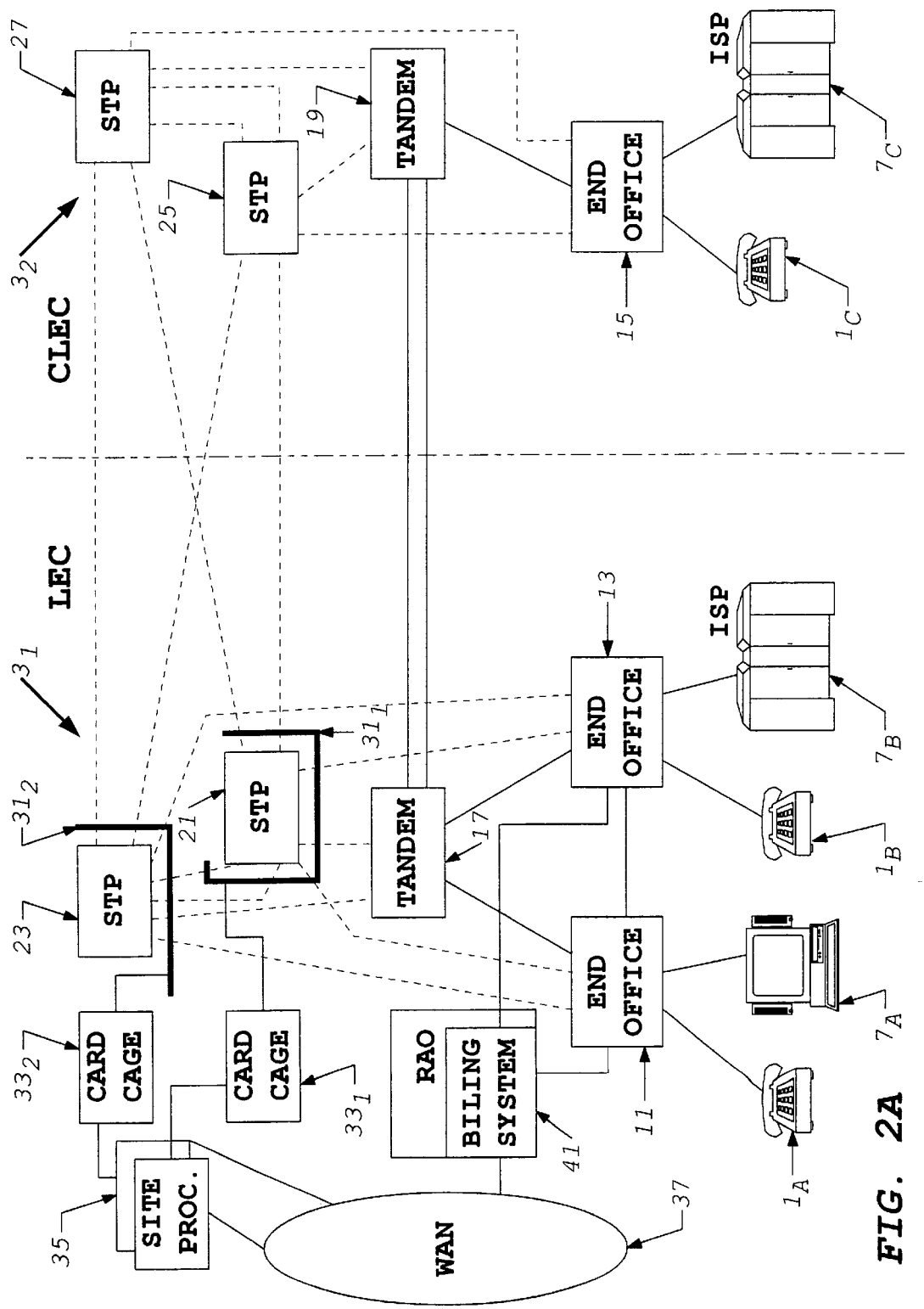
FIGS. 2A and 2B, together, provide a block diagram overview of a public switching telephone network with a traffic tracking system in accord with the invention. Of these two drawings.

Referring to FIG. 2A there is shown a block diagram of a public switching telephone network and the SS7 (signaling system seven) network that carries the call control signaling for the switched network. In reality, the public network that we think of as the telephone network comprises many segments operated by different carriers, including local exchange carriers (LECs) and interexchange carriers (IXCs). For purposes of this discussion, FIG. 2A illustrates two such segments or sub-networks. One sub-network is a network $3_1$, operated by a LEC. The other sub-network could be that of an IXC or any other carrier, but for purposes of this discussion, FIG. 2A depicts a second network or segment $3_2$ operated by a competitive Local Exchange Carrier (CLEC).

The switched portion of telephone network consists of a series of central office (CO) switches, which are conventionally referred to as signaling points (SPs) in reference to the SS7 network. Certain of these SPs comprise end offices (EOs) illustrated at 11, 13 and 15 in the drawing. Each signaling point has a point code comprising a 9-digit code assigned to every node in the network. As discussed more later, messages communicated via the SS7 signaling network utilize the codes to identify source and destination SPs, and the traffic tracking system can use these point codes to identify messages relating to traffic through particular offices.

The end offices 11 and 12 represent end offices in the region of one operating company or LEC, whereas the end office 15 represents one of the end offices in the region of a different operating company, in this case a CLEC. Each operating company has its own network ID, which is used as the first three digits of the point codes of the SPs of that carrier's network.

Also, each end office resides within an area assigned NPA digits as an area code. Each exchange is identified by one or more three-digit codes referred to as NXX digits. Each such code corresponds to the NXX digits of an NXX-XXXX (seven-digit) telephone number or the three digits following the three area code digits (NPA) in a ten-digit telephone number. As a result, the NPA-NXX digits of telephone numbers also can serve as identifiers of end offices. Origination and destination telephone numbers appear in various SS7 signaling messages and various records that the offices create for billing and the like.

Digital trunk circuits, shown as solid lines, interconnect the switching offices of each network 3. Typically, within one carrier's network $3_1$ end offices, such as end offices 11 and 13, are directly interconnected by trunk circuits. For overflow traffic and/or for connections to other carrier networks, the offices 11 and 13 also connect via trunk circuits to a tandem office 17. In the CLEC network $3_2$, the end office 15 connects through a trunk circuit to a tandem 19 or direct to an end office. The LEC and CLEC networks $3_1$, $3_2$ interconnect through trunk circuits shown for example between the tandems 17 and 19, although end office interconnections are possible.

The present invention relies on monitoring of interoffice signaling messages and of certain records normally associated with billing functions. To understand these monitoring functions it may be helpful to review the signaling and billing record functions of the network. We will first consider interoffice signaling.

The SS7 type interoffice signaling network comprises a series of Signal Transfer Points (STPs) shown here at 21, 23, 25 and 27 and interconnecting data links indicated by dotted lines. Each STP in a network connects to the SP capable offices in that network via A links. Thus, in the LEC network $3_1$, the end offices 11, 13 and the tandem 17 connect to the STPs 21, 23 through A links. Similarly, the End office 15 and the tandem 19, in the CLEC network $3_2$, connect to the STPs 25, 27 via A links.

Within the LEC network 3₁, the STPs 21 and 23 constitute a mated pair of STPs connected to each other via C links. Within the CLEC network 3₂, the STPs 25 and 27 also constitute a mated pair connected by C links 58. Each of these mated pairs serves its respective transport area and/or carrier network. Persons skilled in the art will recognize that there may be multiple mated pairs per region or carrier, one pair for each designated transport area.

The STP 21 connects to the STP 25 via a B link, and the STP 21 connects and to the STP 27 via a D link. Similarly, the STP 23 connects to the STP 27 through a B link, and the STP 23 connects and to the STP 25 through another D link.

As will be understood, the A, B, C and D links are physically identical links. The letter designations for these various links relate to cost in terms of ease of access. The A links represent the lowest cost. The B and D links have the same route cost with respect to SS7, so that the D designation is used only because it extends diagonally in the drawing. The C links are used to communicate between the two mated STPs of a pair, for network management information and also constitute another message route. The STP pair cannot function without the C links. Unnecessary utilization of the C links causes congestion and prevents the paired STPs from performing their intended function.

The STPs in any mated pair have the same translations. Thus, the translations in STP 21 are the same as the translations in STP 23, and the translations in STP 25 are the same as the translations in STP 27. The translations control the message routing through the STP.

The STPs may connect to transactional database systems, such as Service Control Points (SCPs), Integrated Service Control Points (ISCPs) or the like. Such database systems, for example, provide call control information for a wide range of recently developed enhanced features. Other database systems, such as the Line Identification Database (LIDB) provide information for ancillary purposes, for example, for credit card validation, for enhanced versions of Caller ID, etc. The monitoring in accord with the traffic track invention captures messages going to and from the tandems or end offices. This includes messages exchanged between the offices and the database systems. Although possible, for our purposes, it is not necessary at this time to separately monitor the links to the database systems. Therefore, for simplicity of illustration, these databases have been omitted from FIG. 2A.

The present invention relies on capture and processing of the common channel interoffice signaling (CCIS) messages exchanged between offices, during otherwise normal call processing. The invention analyzes considerable information derived from such messages. It may be helpful at this point to consider the preferred protocol for such messages, signaling system seven (SS7), in some detail. A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. OMAP specifies protocols for certain specialized messages relating to maintenance and operations. Although the tracking system can capture and analyze TCAP and OMAP messages, for purposes of the presently preferred embodiments, the most relevant part is the ISDN-UP, sometimes referred to as "ISUP". ISDN-UP specifies the procedures and message protocols for setting up and tearing down trunk connections for calls utilizing common channel interoffice signaling (CCIS). ISDN-UP messages, for example, include an Initial Address Message (IAM), an Address Complete Message (ACM) and an Answer Message (ANM).

SS7 specifies an Application Service Part (ASP) for performing presentation, session and transport layer functions for the TCAP and OMAP protocols. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

Figures 3, 4:
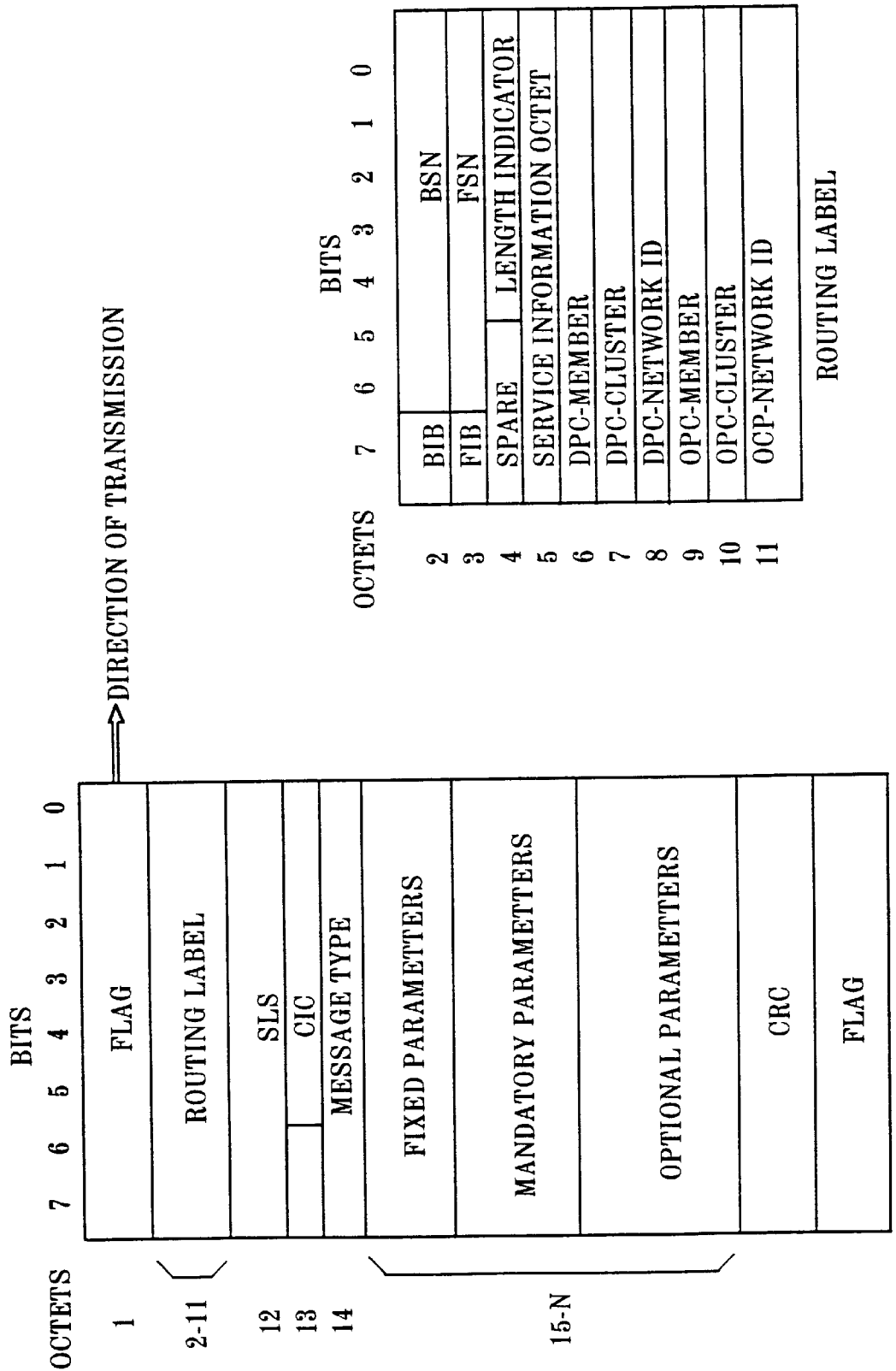
FIG. 3 illustrates in graphic form the layout of an SS7 message.
FIG. 4 graphically depicts the layout of the routing label portion of the SS7 message of FIG. 3.

The SS7 messages traverse the network at all times. The messages themselves comprise digital serial messages that come to the STP for routing. FIG. 3 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15–N contain the actual message, in the form of fixed parameters, mandatory parameters and optional parameters. The length of the mandatory parameters field and the optional parameters field are variable. After the parameter fields, there are 16 other bits for Cyclic Redundancy Codes (CRCs) followed by another flag, which constitutes the end of the SS7 message (and typically the start of the next message). The CRCs constitute an error detection code.

Several of the traffic tracking studies rely on translation and/or analysis of certain addressing information from the SS7 messages. The addressing information used for the MTP and for the traffic analysis appears in the routing label. FIG. 4 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill-in signals. The MSU indicator type SIO octet is formatted and encoded to serve as an address indicator, as discussed below.

The routing label includes fields for both destination related addressing and point of origin addressing. The destination or 'called party' address for the SS7 packet message itself includes octets 6, 7 and 8. Octets 9–11 carry origination point code information, for example member, cluster and network ID information, for the node on the SS7 network sending the message.

In the example shown in FIG. 4, the three octets of the called party address contain an actual destination point code (DPC) identified as DPC-member, DPC-cluster and DPC-network ID information. In operation, the translation tables stored in an STP cause the STP to actually route based on the DPC without translating any of the DPC octets into new values. The called party address octets (6–8), however, may carry other types of called party addressing information and receive different treatment by the STP. For example, these octets may carry a global title (GTT) and subsystem number (SSN) information.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

The MTP processing of the STP routes SS7 packets based on point codes. When an STP receives a packet, the STP examines the address indicator octet (5). If the indicator shows that the called party address octets (6–8) contain DPC bytes only, then there is no translation of the DPC bytes, and the MTP processing by the STP will route the packet based on the DPC value. If the address indicator (octet 5) shows that the called part address octets (6–8) includes global title information, then the signaling connection control part (SCCP) protocol layer processing in the STP translates the global title (GTT) into a destination point code (DPC) and inserts the destination point code into the SS7 packet. The subsequent MTP processing will route the packet using the translated DPC value.

The SS7 network constitutes a highly redundant data network, generally using 56K switched data circuits for the various links to and between the STPs. Because of the redundancy, different signaling messages for a given call may actually transit different routes through the SS7 network.

The operation of placing a call from telephone 1A to telephone 1B may be summarized with reference back to FIG. 2A. The user at station 1A picks up his handset and dials the number of station 1B, which normally resides in the end office 13. The SP end office 11 generates an Initial Address Message (IAM) with a destination point code for the end office 13 and an originating point code of the end office 11. The IAM includes a variety of information needed for call set-up. The end office 11 sends the IAM to either STP 21 or STP 23. That STP examines the address information and its translations and routes the message offer the next appropriate link, in this case over the A link to the end office 13.

In response to the IAM message, the end office 13 determines whether or not the line corresponding to that number is busy. If the line is available (not busy), the end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to the end office 13, and it may go to the other STP of the pair. However, again, the STP receiving the message examines the addresses and uses its translations to forward the message over another link to the appropriate destination, in this case the end office 11.

The end office 11 sends ringback tone over the line to the calling station 1A. At about this time, the end office 1B applies a ringing signal to the line to the called station 1B. The calling party hears ringback tone and awaits an answer. The station 1B rings to alert persons at the destination to the presence of an incoming call.

If someone or an answering machine answers the call at the station 1B, there will be an off-hook condition on the line; and the end office 13 will recognize this as a ring-trip condition. The end office 13 interrupts the ringing signal on that line. The end office 13 also sends an Answer Message (ANS) back through the SS7 network to the end office 11, indicating that the called telephone station 1B was picked up.

At that time the necessary trunk circuits between the end offices are connected together and assigned to the call. The trunk connection may run through the tandem 17, but in this example, the trunk connection extends directly between the end offices. The end office 11 connects the line for station 1A to the trunk circuit, and the end office 13 connects the line for station 1B to the trunk circuit. At this point a complete voice-grade telephone connection exists between the two stations, and the parties can speak and receive verbal information.

The SS7 monitoring system may be implemented on any carrier's portion of the PSTN. In the illustrated example, the LEC network $3_1$ has the monitoring and call detail compilation equipment, for the traffic tracking in accord with the present invention. According to the invention the LEC portion of the public switching telephone network (PSTN) is provided with a traffic monitoring and analyzing system comprising monitors 31, card cages 33 and one or more site processors or servers 35, of the type described in detail in the above discussed Pester Patent. One commercial implementation of such an SS7 monitoring system is currently available from Hewlett Packard, under the product name "AcceSS7".

FIG. 2A shows the sets of monitors or interfaces $31_1$, $31_2$ to the SS7 links to the STPs 21, 23 in diagrammatic form, as solid bold line across respective links. A card cage $33_1$ connects the monitors $31_1$ to a site processor 35. Similarly, a card cage $33_2$ connects the monitors $31_2$ to the same or another site processor 35. The monitors 31 may be conductively or non-conductively coupled to the links to serve as passive interfaces. The card cages 33 connect the monitors 31 to a site processor 35 for accumulation, storage and processing of the raw SS7 messages.

It is intended that multiple monitoring systems of this type serving different purposes may advantageously exist in the PSTN, for example for operations monitoring and/or fraud detection, in addition to the system illustrated from traffic tracking and analysis. For simplicity and clarity, however, only a single system is here illustrated.

The SS7 A link signaling in a completed call typically includes an Initial Address Message (IAM) an Answer Complete Message (ACM), an Answer Message (ANM), Release Message (REL), a Release Complete Message (RLC), and the various other elements described hereinabove. Since the common channel signaling system is intentionally redundant, the messages in a related set may be routed over different A links. In our example, the IAM may go through STP 21, whereas the ACM and ANM may just happen to go through the STP 23. It is therefore necessary to monitor an appropriate set of links and to reassemble the signaling pertaining to a desired transaction or signaling set such as a single call, to provide one call detail record or CDR. This is accomplished in the site processor 35 in a known manner as described in the Pester or Brockman et al Patents.

It should be noted that the PSTN conducts signaling on all interoffice calls, and the monitoring system traps messages and compiles CDRs for all interoffice calls. In particular, the system provides CDRs for both calls completed to a destination station and calls that terminate without completion. For example, the system accumulates CDRs for calls that are blocked because the called line is busy, because there are no network resources available to the terminating end office (network busy), etc.

With the reassembled message sets the site processor has the data to show the called and calling stations 1A, 1B, the start time of the call, the elapsed time of the call, the originating office, the terminating office and various other detailed data. By monitoring the SS7 signaling for all of the calls originating in, terminating in or passing through a designated switch, such as the switch 15, it is possible to analyze the traffic to identify particularly significant patterns. For example, based on a pattern of calls to a certain number, it is possible to identify the number of an ISP 7C served through the CLEC switch 15. Knowing that number, it is possible to gather all of the desired information about calls going to the ISP 7C via an interswitch path, including the numbers of calling customers and the number of calls or minutes of use of such calls by each customer. The assemblage of the raw call detail data desired for a particular purpose occurs at the site processor level.

Figure 2B:
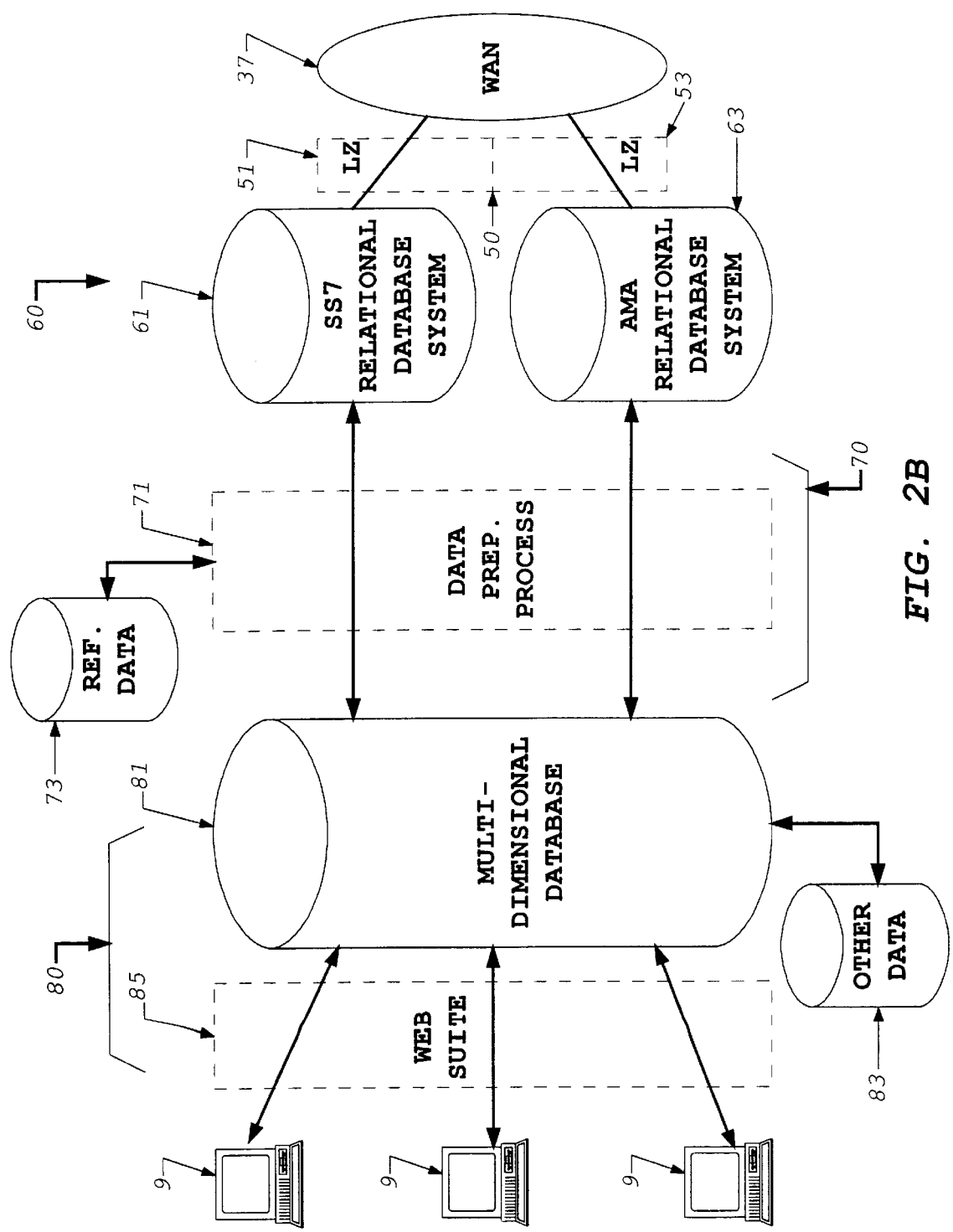

One or more site processors 35 accumulate the CDRs for the traffic monitoring application of the present invention. Periodically, each site processor 35 transmits the latest set of CDRs over a private wide area network (WAN) 37, operated by the LEC for its internal business purposes. The WAN 37 may carry a variety of LEC network operations data. For purposes of the discussion, the WAN transports the CDRs from the site processor 35 to a computer system or server running a relational database 61 (FIG. 2B) for the accumulated SS7 data.

The CDR compilation and forwarding routine in the site processor 35 executes a special procedure for long duration calls. If a call is in progress at the point in time for its programmed uploading to the relational database 61, say midnight, the site processor 35 creates a "call-in-progress" CDR, indicating the start time and duration of the call to that point. Later, when the call ends, the site processor creates another CDR as if the call started at the point in time (midnight) and lasted for the remaining duration of the call from that time until release.

It will be understood that calls completed through a single switch, such as a call from telephone terminal 1B through end office switch 13 to ISP 7B, will not generate the above discussed SS7 signaling and thus will not be reflected in the CDRs developed from such signaling. For such intra-switch calls, and for otherwise supplementing the call detail information derived from monitoring the interoffice signaling messages, the invention utilizes data accumulated by the switches.

As outlined above, the site processors 35 assemble and process information with respect to inter-switch calls but do not handle intra-switch calls. In order that all traffic may be monitored and analyzed it is a feature of one embodiment of the invention to utilize Automated Message Accounting (AMA) data.

Various network elements, such as the switches 11, 13 and/or 17 of the LEC network 3, generate AMA records. Such records: are used to provide call details to enable the local exchange carrier to bill for the completed calls, for example to bill the end users, to bill interexchange carriers (IXCs), to bill CLECs, etc. The AMA records may also provide call details for other network operations, e.g. for maintenance purposes.

In operation, a switch examines a customer's service request, typically the destination telephone number, and based on customer profile or service information determines if there is a need for AMA recording for the call. If so, the switch outputs AMA records for significant events in processing of the call. The AMA records are typically in the Bellcore AMA Format (BAF).

The AMA records from the switches go to one or more billing systems 41, typically in a regional accounting office (RAO). The records may be transported to the RAO by physical transport of data tapes, but preferably, each of the switches has an AMA Transmitter (AMAT) or the like coupled to an appropriate data link to allow electronic communication of the records to the RAO. Although shown separately, these data links may be logical links provided through the WAN 37.

In the RAO, the AMA data records are edited and checked for integrity and supplied to the appropriate billing system 41. For this purpose, a message-processing server (MPS) assembles the various entries relating to a call into a completed message. Any incomplete messages are analyzed for administrative purposes and fraud detection. The complete messages are loaded into the billing system 41.

For example, a billing system, which some carriers refer to as the Customer Record information System (CRIS), processes records for end user billing. The CRIS system calculates the monetary amount for each usage event, identifies the appropriate customer's billing account and posts the billable amount to that account. Another common example of a billing system is the Carrier Access Billing System (CABS) which LECs use to process AMA records to calculate and post tariffed charges for other carriers such a cellular companies, IXCs and CLECs.

The billing system 41 may spin-off the AMA data for completed calls, for ancillary purposes. In accord with the invention, the billing system transmits certain completed AMA message data to a server, which maintains an AMA relational database 63. The billing system could transmit the AMA records for all calls through the network, but that would produce a massive amount of data, much of which is unnecessary for studies that are active at any given time. Preferably, the billing system 41 is programmed to forward AMA records only for calls that are pertinent to some on-going traffic track study, for example all calls terminating in an identified end office during a specified study period.

The AMA system typically records call details only for billable calls, e.g. for toll calls but not for flat-rate local calls.

However, for purposes of the traffic track studies, translations are established in the switches to accumulate and forward the AMA data for all calls of interest, e.g. for all calls passing through the LEC network $3_1$ coming from or going to the CLEC network $3_2$. Preferably, these added AMA translations are stored in all of the offices 11, 13, 17 but can be turned-on or off, as appropriate for particular studies.

As will be understood by those skilled in the art, AMA equipment records call details at each stage of a connection. The calling and called party numbers are registered initially. An answer entry registers the time of connection, and the terminating entry registers the time of disconnect. A common identifier in each entry serves to link the entries relating to a particular call, to distinguish them from those of other calls. The processing of the AMA data in the RAO and billing system 41 assembles the entries for completed calls into complete messages directly analogous to the CDRs produced through SS7 monitoring. Any incomplete messages are analyzed for administrative purposes and fraud detection. For tracking purposes, the billing system 41 delivers the processed AMA call data to the WAN 37. The WAN 37 in turn delivers the data to a central server running the AMA relational database system application 63.

Both the AMA components and the SS7 monitoring components accumulate call detail records. The AMA records relate to each completed call originating or terminating through a switch 11, 13, or 17 having active AMA reporting software. The SS7 records relate to each call (completed or not) through the LEC network $3_1$, which involves interoffice signaling for call set-up. These records for each call take different forms, depending on the equipment accumulating the data, and the two different types of records are uploaded into two different databases 61, 63. Both types of call detail records are essentially flat files, containing detailed information about each call.

In actual operation, the processing of loading the flat files for the call detail records into the respective databases 61, 63 involves some initial record collection and management processing, referred to as a landing zone or "LZ" process 50. The LZ 50 manages the incoming CDR data streams, checking for errors and loading the data into the relational database tables. The LZ 50 buffers incoming records and periodically uploads the records into the tables. The records follow a first in, first out (FIFO) logic at the landing zone.

Because the two types of call detail records are somewhat different, the landing zone 50 actually comprises two different LZ routines 51, 53. The landing zone process LZ 51 is specially adapted to buffering and loading the SS7 CDRs from the site processors 35 into the tables defined in the SS7 relational database 61. The landing zone process LZ 53 is similar, but differs in that it buffers and loads the AMA records from the billing system 41 into the appropriately designed tables in the AMA relational database 63.

The illustrated embodiment implements two relational databases 60, 61. An example of appropriate database software is available from Oracle.

A two-dimensional database record is just a flat file. A two-dimensional database has individual tables, created for a given collection. The SS7 relational database 61, for example, stores Call Detail Records (CDRs) for millions of calls relating to a particular traffic study. In a study for traffic to and from the CLEC, the table would contain CDRs compiled from the SS7 messages on the B and D links between the STP pairs. The landing zone process 51 for the SS7 records takes all of those Call Detail Records and loads them into one or more tables set up for the exemplary study. Such a table includes every Call Detail Record and every dimension or piece of information within the individual Call Detail Records in a linear form. As a result of the landing zone processing 51, there is a table, within the table there is CDR 1, CDR 2, etc., and within each CDR there are X dimensions for the X different items of information within each CDR.

The example given above involves loading SS7 CDRs into the relational database 61. It should be noted, however, that an essentially similar landing zone process 53 occurs for loading AMA records into the tables in the AMA relational database 61. The tables consist of flat files for the complete AMA records of each call. The amount of information, the dimensions if you will, are somewhat different than those for the SS7 CDRs. Each AMA record for a call includes similar information, including the calling number, the called number, the duration of the call, the time of the call and some class of service information. However, an AMA record does not include the originating point code or the destination point code.

In the relational databases 61, 63, the call records include study identifiers and a study "type" flag. The identifiers can be used to identify the particular studies to which the records relate. The study type flag indicates the general type of the particular study, e.g. tandem, Internet, CLEC, etc. Preferably, the software running in the site processor(s) 35 and the billing system(s) 41 add the study identifiers and the study "type" flags to the call records before supplying the records through the landing zone procedures to the relational databases.

According to a preferred embodiment of the invention the relational databases 61, 63 are connected to a processor or server running an OLAP program, preferably in the form of a multi-dimensional database 80. As will be understood by those skilled in the art, an OLAP processor and database is an OnLine Analytical Processing database designed for fast access to summarized data. Using specialized indexing techniques, it processes queries that pertain to large amounts of data and multidimensional views of data much faster than traditional relational databases. Among other things it provides an Executive Information System (EIS) that consolidates and summarizes ongoing transactions within a system to provide a data warehouse. One fact table is surrounded by a series of related tables which the processor is capable of "drilling into" to obtain additional information.

Multi-dimensional database software providing these capabilities is available from Gentia Software, Inc. of Wakefield Mass. under the product name of Gentia DB. The Gentia DB is a fully OLAP-compliant multidimensional database. Similar to Essbase, it is loaded with data derived from various company data sources, and is preconsolidated. Gentia supports an "unlimited" number of dimensions, as well as multiple hierarchies within a dimension. It is a fully object oriented visual development environment, with a library of predefined objects, and provides an OLAP database with tools for loading, analysis, querying, and reporting.

Gentia runs on multiple platforms and is scalable across a large system. The multi-dimensional database program could run on a server, and the relational databases 61 and 63 might run on separate servers. Alternatively, two or more of these databases may run within one computer system or server. The server running the multi-dimensional database (MDDB) 81 is accessed by multiple user work stations 9. Although the system may implement a client-server interface, preferably, the database 80 provides a web suite 81 for a user interface, enabling access using standard browser software in the workstations. The actual server may connect directly to the terminals 9 or communicate therewith through a data network, such as a private LAN or WAN or the Internet.

The relational databases 61, 63 just store raw call record data. For example, the database 61 contains the raw CDR data, as it compiled by the SS7 network monitoring equipment and supplied by the site processor 35. From the relational databases, the AMA and SS7 CDR data goes through processing referred to as data preparation 71. The data preparation step enriches the data.

As noted, the MDDB 81 may run on the same computer system that runs one or both of the relational databases 61, 63. Logically, the data preparation software 71 runs as a separate (e.g. Oracle) relational database. The MDDB is platform independent and may reside in the same server as the relational database or in a separate server. The data preparation software accesses records from each relational database and uploads the prepared data to the MDDB. The MDDB processes data from those records to generate analytical tables, reports and graphs.

Figure 5:
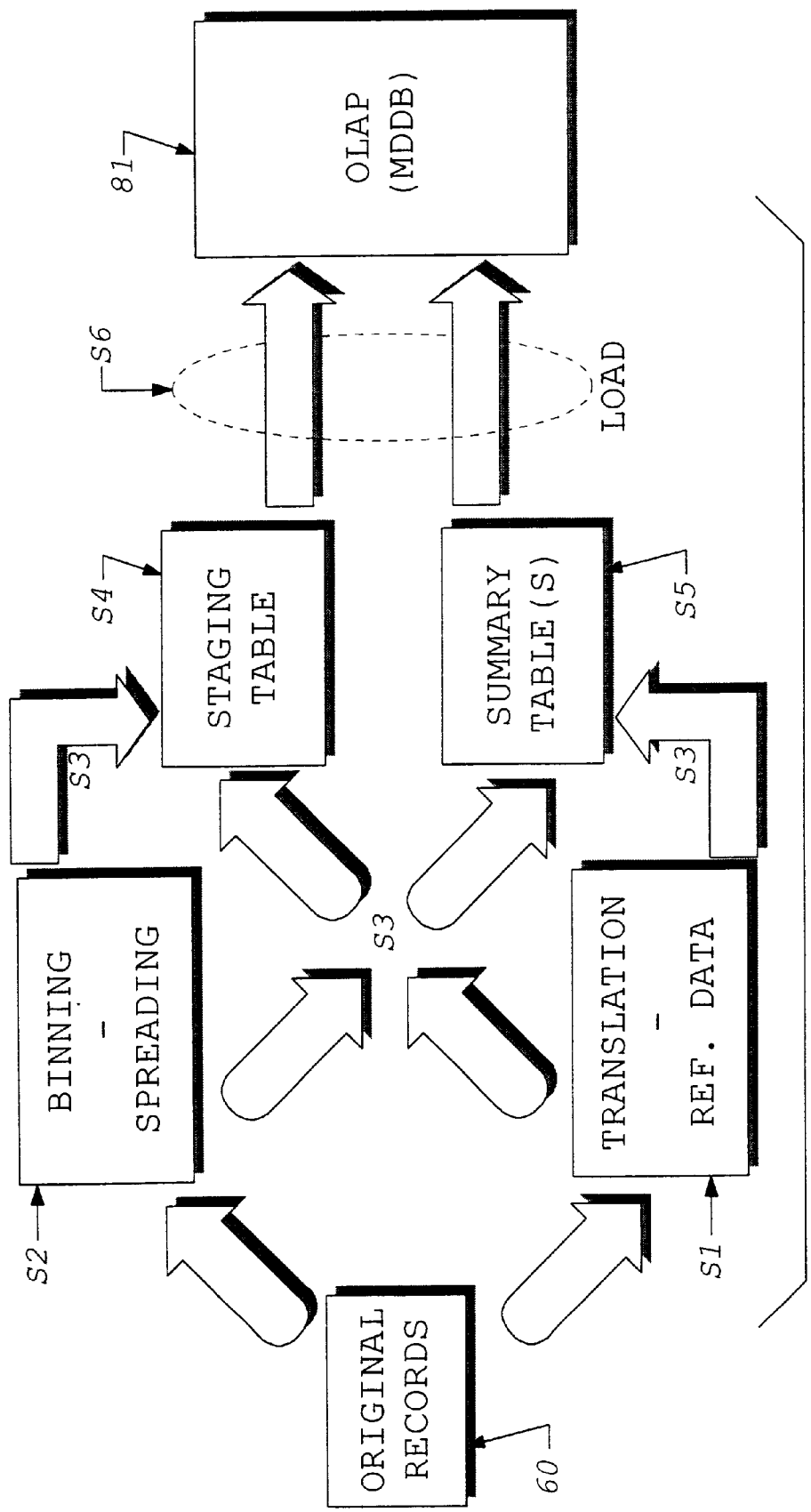
FIG. 5 is a flow chart useful in explaining the operations involved in data preparation.

FIG. 5 is a high-level process flow diagram depicting the operation of the data preparation routine 71. Data preparation involves essentially three major functions, data translation, binning and assignment of records to tables.

Thus, in the drawing, the original records from the relational database 60, either SS7 CDRs or AMA records, can be translated using external reference data (S1). The data preparation program 71 also executes an algorithm for binning or spreading of usage data from the records, to properly allocate usage that may extend over multiple hours to the appropriate hourly time periods (S2). At step S3 (shown as multiple transfer arrows) the enhanced records resulting from the translation (S2) and the binning (S3) are compiled into one or more predefined tables.

In the illustrated embodiment, the data preparation program 71 generates a staging table (S4) and one or more summary tables (S5). The staging table contains the complete enriched record information, whereas a summary table contains a more limited set of information to provide a desired summary of certain aspects of the traffic. At S6, the data preparation routine 71 uploads the resulting tables into the OLAP program, in the preferred embodiment, the MDDB 81.

A more detailed description of the major functions of the data reparation procedure follows.

As noted, one function of the data preparation relates to enhancement of the raw data by application of external reference data 73. Typically, the reference data provides a translation of the data elements from a raw form to some more useful form. For example, in this process, the software takes the SS7 address information, the origination and destination point codes, and accesses associated reference data 73. The reference data might include an inventory of all of the SS7 point codes. The data preparation routine 71 might recognize that a point code of 242015363 equals an MCI-Metro switch in downtown New York. Similarly, the data preparation routine might translate a point code of 24709562 into the Common language location identifier (CLLI) code switch identification for the Bell Atlantic West Street DS1 switch.

The data preparation routine may be written in PL/SQL language. The data preparation routine preferably runs on the same computer that maintains each particular relational database and effectively runs on top of the relational database application. The data preparation process accesses additional reference data 73 that may reside in the same or a separate computer system.

This data preparation operation of software 71 may operate mainly on the data from the SS7 relational database 61. Those skilled in the art will recognize, however, that a similar data preparation operation may apply to data uploaded from the AMA relational database 63. The data preparation for the SS7 data, for example, may translate a point code into an identifier for the carrier and/or the specific switch as noted above. The data preparation operation for either SS7 or AMA might translate the NPA-NXX of either the dialed or calling party number into an identifier for the carrier and/or the CLLI code for the specific switch. In some cases, specific numbers may be translated into identifications of the actual subscriber, for example to identify a party believed to be operating as an ISP.

For studies of traffic through switches, the data preparation process takes all of the raw CDRs and groups them by a point code and translates each point code into the English identifier for the switch corresponding to the point code, i.e. into something that people understand. In one embodiment, the English identifiers for the switches comprise CLLI codes.

Another data preparation operation using reference data 73, albeit for a different study, might convert the telephone number(s) of one or both parties to a call into office equipment (OE) identifier(s), for subsequent use by a Network Administration Center (NAC). The preparation might apply to a study designed to find high users, e.g. served through a particular end office.

Another major function of the data preparation process 71 is to "bin" the calls by hours of the day. For engineering purposes, it is important to know traffic loads by hours, particularly to identify typical peak busy hours and determine loads during such hours. Categorizing calls and CDRs by hours is significant here because CDRs often relate to calls that can span hours. For these reasons, a significant operation of the data preparation process is to make sure that the calls are binned into the hours of the actual usage. For example, an Internet call might start from PC 7A to ISP 7C at 8:15 PM and last until release at 10:20PM. As such, the start-time hour would be the hour from 8 to 9 PM, but all those minutes of use should not appear to in that one hour. The binning process allocates 45 minutes of use in the 8 to 9 o'clock hour, 60 minutes in the 9 to 10 o'clock hour, and then 20 minutes in the 10 to 11 o'clock hour. To achieve this accurate binning of calls from the CDRs, the data preparation operation goes through every single CDR, examines the start time and duration and applies minutes of usage into the right hour of the day.

The binning function is performed by the data preparation software 71 and requires no further database processing. As noted, the preparation software is a PL/SQL language routine running on top of the relational database application within the same computer that maintains each particular relational database. The MDDB software can display certain results from the binning process, without further processing of the data.

The data preparation stage 71 also assigns each AMA record or SS7 CDR to one or more tables, according to application type. For example, for the SS7 CDRs, a "staging" table is the primary table used for binning all the calls and then forwarding to a second table or to a third table for summaries prior to input into the Gentia implmentation of the MDDB 81. Other commonly used SS7 CDR tables include an "Office_Pair" table for tandem studies, an "Office_Summary" table for end office studies, and a "PIU" table for studies of the percentage of internet usage in comparison to the percentage of local usage.

The data preparation function is an automatic process. Although there are some common aspects for all studies, data preparation actually is adapted to different types of studies. For example, for tandem studies, the data preparation translates point codes and/or NPA-NXX codes into English language identifications for the originating and terminating end offices. As a result, the analysis of the enriched data through the OLAP shows the engineer traffic patterns between end offices that are running excessive overflow traffic through the tandem. In the illustrated example, the analysis might show that during peak traffic hours the end office 11 is routing a large number of calls for the end office 13 through the tandem 17, e.g because of the opening of the new ISP 7B. To de-load the tandem, the LEC engineer would initiate deployment of new trunks directly between the end offices 11, 13 to carry the identified traffic.

To enable the automatic data preparation function, as part of the initial set-up of a study, the CDR data from particular sources is pointed at the appropriate data preparation function based on the study-type flag in each CDR. In the tandem study example, for a new study of the tandem 17, the data captured by the SS7 monitors 31 and the site processor 35 relating to calls routed through that tandem would go through-the tandem version of the data preparation process when being transferred from the SS7 relational database 61 to the multi-dimensional database 80.

It may be helpful to run through the details of one possible implementation of the data preparation software for the SS7 records in somewhat more detail, as one specific example of the software for processes 71. The data inputs of the SS7 data preparation program 71 are an original CDR table containing call detail records from the relational database 61. Other inputs include a point code table and an NPA-NXX table from the reference data 73, for mapping point codes as well as area codes and prefixes to offices, preferably identified by CLLI code.

The data outputs of the data preparation program 71 include a modified CDR table referred to as a "staging" table. The records in the staging table have the calls spread to and indexed by hours. The data preparation program 71 also outputs various summary tables designed for the particular study models, such as the office summary table, and the office-pair summary table, etc. The office summary table, for example, summarizes the spread call durations, attempts, completions, and related data, organized by study, office, date and hour. The similar office pair summary table organizes the same data by office pair. The office summary table provides material for MDDB loads for end office studies. The office pair summary table provides material for MDDB loads for studies of the traffic between offices, such as tandem and trunk loading studies.

The data preparation program reads the input table of original CDRs, performs the reference data translations and spreads the calls in the modified CDR staging table. The spreading effectively achieves the desired binning of the calls, as discussed above. The data preparation software 71 also accumulates the spread call durations in any appropriate summary tables, such as the office and office pair summary tables.

The user interface could be a client-server type interface. Preferably the MDDB 81 implements a web suite interface 85. With the web suite, the user station 9 can utilize a standard browser. Logically, the user would log onto the traffic track server running the MDDB 85 and view pages for the various presentations. The pages would include links to other presentations, to allow the user to 'point-and-click,' to select further information for display as subsequent pages. Each study runs for some predetermined period of time selected by the user. The results, however, are available in real or near real-time. The process could take several days or a week, depending on available processing power. Preferably, results will be available overnight. For example, if a user sets up a study on the tandem 17 for Sep. 10, 1998, the study begins at midnight, data is uploaded to the relational databases periodically for the 24-hour period on that date. The SS7 and/or AMA data records are collected into the landing zone at midnight and uploaded into the relational databases. Then the data preparation for the new CDRs begins at one o'clock (AM) the next morning and finishes loading in the MDDB about four o'clock (AM). The results of the study are available to the user at the beginning of the next business day, e.g. nine AM Sep. 11, 1998. For a study over a longer period of time, e.g. a month long study, the user can access the latest results each morning.

The web suite software 85 together with the MDDB software 81 performs all necessary OLAP processing. As part of this function, the software implements a Data Collection and Study Management Tool set, which enables the user to set up and control studies using the traffic track system. In an environment where there will not be constant and simultaneous data collection from all links off of each site processor, the system operates under the concept of a "study". This study concept is the means or unit of requesting data collection. As noted, each study needs to be assigned a unique identifier and a "type" flag.

The study is the trigger for activating specific sites/links and for identifying the application(s) or model(s) needed for analysis. As such, the study triggers activation of specific application loader processes between the relational databases and the corresponding application in the MDDB. This operating environment requires a tool set for managing the data collection and end-to-end application resources.

The tool set can be broken out into three major categories: System Administration/Resource Management; Study Management and Database-Application Interface; and User Interface. Within the Data Collection and Study Management Tool set, there is a software tool for performing each of these three major management functions. Each individual tool is summarized below.

The tool for System Administration Resource Management serves as an interface for associating the current collection configuration with the requested studies. Additionally, this tool provides the administrator with the data collection statistics necessary for prioritizing and coordinating multiple study requests. The tool provides the graphical user interface (GUI) to manage the link configuration associated with study request information, including identifying the links targeted for collection, the collection start date, the requested duration, the requesting operator. The toll also provides an administrative view to track collection statistics, such as targeted links, total volume of CDRs per link, volume/link as % of total and CDR statistics.

The tool for Study Management manages and coordinates the database-to-application interface and provides study specific data collection statistics. Presentation of study results involves an application running on the OLAP software. The applications are specific to the different types of studies and serve in part to implement the type-specific study models.

The tool for Study Management also provides the Database-to-Application interface. As such, this tool includes the actual application loader, for loading the application software associated with the predefined models of different types of studies. The application loader identifies which of the data records within the full database are valid for inclusion in the application analysis. Preferably, the application loader also culls these out of the database for the application loading process. The application loader provides an efficient mechanism for retrieving the key study details in order to load user interface screen/menu displays.

Another function of the Study Management tool is to provide an Administrative View of study statistics. The statistics viewed for administrative purposes may include: the studies running, associated collection links, set-up date for each study and whom requested by, the status and duration of each study, the volume of CDR's collected, the volume as a percentage of system total, and the percentage if any of data which may be auto-archived for the study.

The primary function of the Application User Interface is to help the users navigate through available applications and corresponding available source data, for presentation of study results. The Initial Screen/Menu on top of all applications identifies for the user the details of the data currently available within the database. These details inform the user of the studies that have been collected and are available for each application analysis. Key study information available through the application user interface includes the study type, e.g. Tandem, ISP, End Office, CLEC, etc. The study information also includes start/end collection dates, the CLLI code identifiers for the offices studied as collection points, and the user group or user requesting the study. The application user interface also may identify a study area, which would provide an indication of the full extent of a geographic area that the analysis covers (i.e. Vermont for an ISP finder study). The information also would indicate the current status of each study, for example, in progress, completed, summary data only, or having detailed data available for drill downs.

The specific per study details are presented to the user such that the user can choose a study and then go directly into the application for that study. The user also has the option to be able to do cross study analysis within the application (where appropriate).

As part of the study management processing, each study is assigned an identification number, during initialization. The site processor 35 includes the appropriate study identifier in the CDRs compiled from the SS7 messages. Similarly, the billing system 41 includes study identifiers in AMA detail records, which it forwards to the relational database 63. The landing zone processing, uploads the records into relational tables, corresponding to the study identifier. The data preparation operation 71 also prepares the data as required by the parameters for the particular study number and loads the data into the appropriate study tables within the MDDB 80. The OLAP processing allows a user to select an application, view a list of studies having a type identifier corresponding to the application, and then select and access results of one of those studies.

The MDDB 80 thus receives enriched call detail records (SS7 and/or AMA) from the data preparation process 71. The MDDB stores the enriched data in predefined models for particular studies, e.g. a tandem study, an ISP finder study, etc.

A database is multi-dimensional in that the information in the files or records are accessible from different "dimensions," where each piece of information in the files or records is in a field of the table, and each field becomes a dimension of the database. The multi-dimensional structure enables the user to "slice and dice the data" however he wants to look at it. For example, the user might opt to look at the 50th Street tandem and view the sources of traffic through that tandem. The user can elect to view data based on standard measures, such minutes of use (MOU), centi-call seconds (CCS) or peg count. CCS is a measure of use similar to MOU but based on units of one-hundred seconds of call duration. Peg count is the number of call originated, i.e. including both completed and uncompleted calls. The MDDB allows presentation of results in tabular and graphical form.

In the OLAP software 80, e.g. the System Administration Resource Management tool running in the MDDB program 81, the operators set up models for different types of studies. The models control the collection of the data and provide standardized screens for access and display of the processed data by the MDDB. For example, for the tandem study there are defined views and tables within that model for presentation. The MDDB software 81 thus allows the developer to go in and generate his own tables for presentation, to enable customized visual development.

The MDDB receives the enriched SS7 and/or AMA call detail records. Using the pre-defined model for a particular type of study, the MDDB 81 goes through the records, picking out information as needed to form the tables for a new study. The study tables are what is actually stored in the MDDB database. The enriched call detail records are then discarded. As such, the MDDB processing effectively compresses the amount of data. However, the relational databases 61, 63 are still in existence, and it is possible to drill down from the MDDB to CDRs in the relational databases. For example, an ISP study might identify the offices originating large amounts of traffic to an ISP's number. Using a drill-down operation, it is possible to identify the calling parties (by calling party number) with heavy minutes of usage from the CDR data in the relational databases.

The data preparation and CDR discard runs in a cycle. For example, in a tandem study application, there is never a reason to go down to the CDRs. Once the system runs through the CDR data preparation and loads the information into the MDDB, the enhanced CDR and the raw CDR in the relational storage can be discarded. In current implementations of the tandem study, every night the data preparation begins at one o'clock (AM) and finishes at four o'clock (AM). Records are purged after the data preparation. CDRs for the next day are collected into the landing zone again at midnight, and they are uploaded into the SS7 relational database. Then the data preparation for the new CDRs begins again at one o'clock (AM) the next morning.

If necessary, the raw or enhanced AMA and SS7 records can be archived, in off-line storage, before purging. For example, for a study of CLEC transit traffic used to dispute CLEC termination bills for reciprocal compensation, the LEC would complete the data preparation and archive the CDRs as back-up information for dispute resolution.

The MDDB 81 also enables the user to look at uncompleted calls. For every inter-office call that does not complete, the release message includes a cause code that indicates why it was not completed. For example, the code for 'no circuit available' means that there was no trunk available in the tandem. The code 'user busy' means a busy condition at the destination. The SS7 CDRs include the cause codes for the uncompleted calls, and the OLAP processing in the MDDB 81 allows analysis and displays using those codes.

Figure 6:
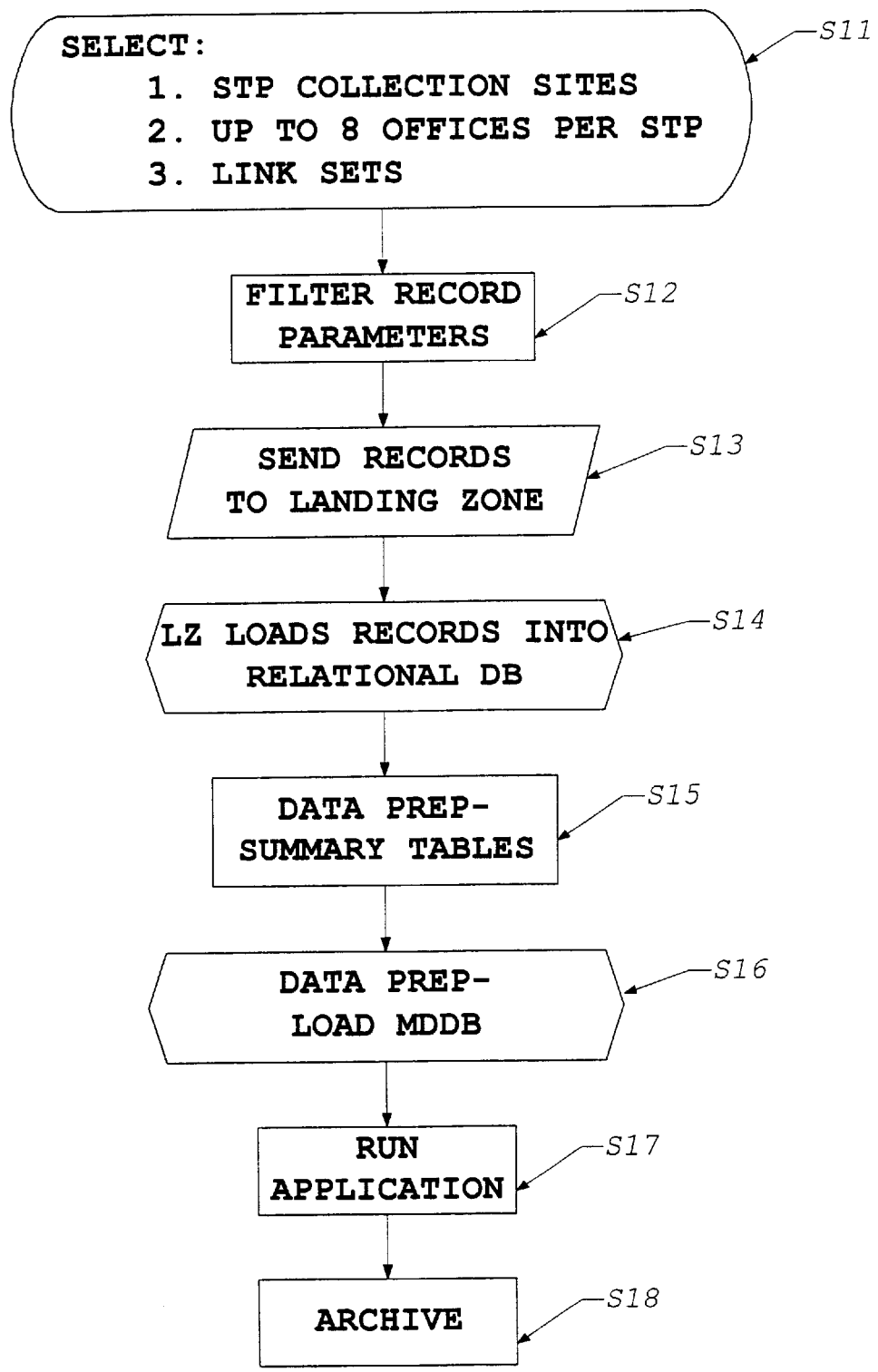
FIG. 6 is a flow chart illustrating the high-level process of overall management of a traffic track study.

FIG. 6 is a flow chart depicting the overall flow of study management, using the traffic track system of the present invention. Most aspects of the process flow have been discussed above in considerable separate detail, but it may be helpful at this point to recap by considering the overall study flow.

As shown at step S11, the process essentially begins with the user inputting a number of study selections. For an SS7-based study, for example, this would involve input of the three selections shown, the STP collection sites, a number of offices associated with each STP (up to 8 per STP) and the link sets to be monitored.

The network elements monitor the records, and filter the records by parameters (S12), based on the input selections. In the SS7 example, the monitors 31 supply messages through the card cages 33 to the site processor 35. The site processor 35 compiles CDRs, and based on the CDR parameters, filters the CDRs to match the user selections. In step S13, the monitoring equipment, e.g. the site processor 35, transmits the records (CDRs) to the landing zone 50. The landing zone process 50 loads the records into the tables for this study established in the appropriate relational database 61 or 63 (step S14).

The data preparation routine 70 prepares the staging and summary tables (S15). As discussed above, this includes the various translations using reference data, binning or spreading of records to properly allocate usage time and loading of data into the appropriate tables. The data preparation routine 70 then loads the tables into the MDDB 81 (S16). Within the MDDB software, a study application is run to present the data to the user (S17). The study application corresponds to the particular type of study, e.g. tandem, ISP, CLEC, etc. The study results also are archived (S18) for future reference. If necessary for the particular study, e.g. for CLEC billing reconciliation, the archiving may include the original record data from the relational databases.

Although not shown, upon completion of the particular study, the application running on the MDDB may enable the user to access other data 83. For example, in an application which identifies end user telephone numbers, such as an ISP finder application or an Internet user finder application, such other data sources 83 might provide the name and address of each identified user. This might enable the LEC to market certain services to the identified parties. Examples of such other databases 83 include CRIS, LMOS and LIDB (Line Identification DataBase).

To appreciate the advantages of the invention, it may be helpful to consider a few specific applications. The following discussion summarizes several different types of studies that may be conducted using the inventive traffic track system.

For a study of the calls to the ISP $7_B$, the card cages $33_1$, $33_2$ are set up to monitor all of the A links into the end office switch 13, which is the switch that serves that ISP. Initially all of the relevant SS7 messages off of those links, which are directed to the number for that ISP, are trapped at the site processor 35. This includes all of those messages including busy and no answer in addition to the messages pertaining to completed calls. Since those messages contain a large quantity of information it is possible to derive quite detailed analysis data.

Preferably the collected call records will contain the following information:
  a) Whether the call is terminating or originating
  b) The total carrier elapsed time (time between IAM and REL)
  c) The total customer elapsed time (time between ANS and REL)
  d) Whether the call was answered and how it was cleared (i.e., busy, normal clearing, etc.)
  e) The date and time the call began
  f) The originating and terminating number.

The site processor 35 processes the raw data from the card cases 33 to formulate call detail records (CDRs) for each call identified through the monitoring of the SS7 messages. The site processor 35 forwards the SS7 CDR data through the WAN 37. The landing zone process 50 checks the CDRs for errors and loads the CDR data into the tables of the SS7 relational database 61.

The translations in the end office 13 also are set so that the switch reports all calls completed to any of the lines to the equipment of the ISP $7_B$. The end office switch 13 forwards the AMA data to the billing system 41, and the billing system 41 compiles completed messages and forwards those messages through the WAN 37. The landing zone process 50 checks the messages for errors and loads the data into the tables of the AMA relational database 63.

The SS7 and AMA data is then preferably aggregated into periodic reports. Once each period, when the above data is assembled, it is processed and compressed into flat files for each ISP containing the following data:
  a) For every hour from midnight to midnight the number of calls attempted that hour, the average call holding time for calls that began in that hour, and the total MOU for calls that began in that hour. Additionally, the average CCS/MS will be calculated for the 24 hour period and the percent of total terminating MOU destined for the particular ISP in the 24 hour period. The CCS/MS is hundred calls seconds per main station. This is a standard measure of usage for a main station in an hour, with a range from 0 (no measured use in an hour) to 36 (line in use for full 60 minutes). The average CCS/MS represents the sum total of all the calls and their lengths of time that collectively make up usage during the busy hour, divided by the applicable number of working main stations.
  b) Each NPA NXX XXXX that called the ISP during the day. For each line number the report will indicate the total customer connect time for the day for that customer and the average call holding time (number of calls divided by total MOU). The report will only include the 100 highest users.

A summary report will also be generated for the day identifying:
  a) The percent of the total MOU for the switch that was destined for all ISPs
  b) The percent (by MOU) of traffic destined to ISPs by originating offices.

A third report will identify the following statistics for a maximum of 300 randomly selected numbers:
  a) The average call holding time for each number
  b) The total MOU for the 24 hour period for each number
  c) The average CCS/MS for each number The foregoing reports will be generated each 24 hour period and written to a disk file in text form. A second report will be generated writing all data to a file in a comma separated list that is suitable for importing into most spread sheets. Additionally, the data will be written in HTML format file for display using any Wed Browser. The latter interface will require HTTP Web Server software at the remote user site 9 as well as access to the computer implementing the multi-dimensional database 80 and web suite software 81.

In the foregoing example, it was assumed that the ISP was pre-identified. While the major point of presence for the larger. ISPs (SprintNet, STTWorldnet, AOL) may be known, there is very limited data available to effectively engineer and administer for the traffic load to lesser known ISPs. Further, there is very little understanding of how CLECs and ISPs themselves are redirecting huge volumes of traffic bound for the Internet across PSTN tandem and IOF networks. It is a feature of this invention that a method of locating and identifying such ISPs is provided.

A preferred methodology for implementing ISP identification and location may be accomplished in the following manner.

1. Designate an end office or tandem switching system that is known to be encountering some congestion.
2. Program the monitoring and analysis system and set the switch translations to generate call detail data for that switch, at least during designated hours known to be peak traffic hours. In the system illustrated in FIG. 2A the tandem office 17 may be selected.
3. Trap all SS7 messages and record all AMA details for calls through the office during the designated hours.
4. Assemble the data from the collected data and process and compress that data to form CSV (comma separated values) flat files in the SS7 and AMA databases.
5. Perform a statistical analysis and determine which numbers had the most calls made to them, which calls had the most minutes of use, which calls had the longest hold times, and which destinations did not originate any calls.
6. Automatically call the numbers thus identified and ascertain which are answered by modems. These represent ISPs, such as the ISP $7_C$ served by the CLEC network $3_2$.
7. Compare candidate ISP numbers to a list of known ISP numbers to identify new ISP numbers. Add new numbers to the list of known ISP numbers.
8. Identify the numbers of the parties which called ISP numbers in the analysis. These are users of the respective ISPs. The information is available from the SS7 and AMA data.
9. Identify the locations of the users and associated end office switches from Telco records or from further translations of the numbers in the CDRs using external data 83.

The information obtained from this analysis will provide an indication of the routes experiencing difficulties and enable strategic planning to eliminate or at least ameliorate the difficulty. For example, attempts may be made to have distressed users install ADSL or other digital subscriber line equipment. Alternatively or conjunctively a Telco data link, such as T1 or other equivalent, may be established from the end office established as handling the bulk of the overload calls directly to the ISP equipment.

Turning attention to the CLEC, telecommunication carriers are entering PSTN markets and buying unbundling network services at an accelerated rate. Frequent and detailed measurement of this new traffic is highly desired from the PSTN standpoint to optimize local switch and tandem design and to effectively plan and implement PSTN off-load strategies. Detailed traffic information is also needed for reconciliation of payments for transit between the LEC and CLEC networks. In the case of analyzing the traffic to the CLEC $3_2$, the monitoring takes place on the C and D links between the STP pairs 21, 23 and 25, 27. In the case of a CLEC every call made is interoffice so that one hundred percent of PSTN/CLEC calls may be monitored using the SS7 signaling. In each case the monitoring and analysis is completely transparent to the trunk circuits and the customers. However the traffic which is being investigated and monitored is the traffic on the trunks where the overload is likely to occur. That is, while the signaling traffic is being monitored it is not the signaling traffic itself that is a matter of concern. On the other hand it has been found that it is possible through appropriate analysis of the signaling traffic data to determine not only that a call did not complete but also the point at which it failed, i.e., the point of congestion. The release code shows that the release was due to network congestion.

In summary, the system shown in the drawings will collect, integrate and compress call record data continuously from across the PSTN switching network. Data from two primary sources, namely, SS7 messaging and AMA billing records, is processed in real time off of various regional platforms and routed to central servers, where the call records are stored in transactional relational databases. Through a networked analytical software application running on top of the relational databases, users of the system can create detailed interactive reports, or perform "on the fly" analysis. The system is configured in a client-server architecture, with a limited user group. However, the system is so designed as to be readily scaleable by users and data volume, expandable to Web Browser interface, and readily integrated with other PSTN databases and platforms.

Needs that will be satisfied by this system include the following:

a) End Office Load Balance Process Support—The system will provide an expedient, flexible, accurate, and cost effective method to identify individual high usage lines contributing to blockage. The information will eliminate the need to perform costly, untimely SLU studies and reduce the number of Line Equipment Transfers required to address office load balance concerns.

b) Tandem/Trunk Planning Resource—Unbundling and the increase in Competitive Local Exchange Carriers are increasing the necessity for tandem switch growth. Effective growth must be dependent upon knowing customer calling patterns, communities of interest and points or origin and destination. The new system will provide the tools to adopt a proactive approach that will provide a long term economic solution for serving future demand.

c) Internet Service. Provider (ISP) Studies—ISP traffic analysis performed with the system will provide the PSTN with a means to monitor ISP traffic patterns on a per ISP/switch basis, and enable the PSTN to better serve ISP customers while maintaining optimal network utilization. The system will also provide unique detailed information on the location and calling characteristics on heavy Internet users.

Consider a study of tandem traffic, as an even more detailed example of application of the invention. All calls that are switched through a tandem produce two records, one for the trunk setup to the tandem, and another for the trunk setup out of the tandem. The first call record, the setup into the tandem, contains the originating point code which identifies the originating switch. It also contains the called party NPA NXX which identifies the terminating switch except in the case where the LEC tandem delivers the call to another tandem. Since the second tandem is not identified by an NPA NXX there is no way to determine the destination of tandem to tandem calls. Fortunately, this condition only happens regularly when a call is sent to, or received from, another carrier which means that end office to end office overflow will be available. This call record also only contains the incoming trunk identifier, the outgoing trunk information is contained in the second part of the call which is not recorded.

Another reason for traffic studies is to relieve the tandem switch itself, even though the call may be directed through that office. The system of the invention provides a means to analyze not only the load going through the tandem but also to analyze the routing within the tandem facility. There are historically a large number of T-1 systems or DS-1s to and from the tandem each providing 24 routes. Thus, while there may be 24 trunks through the tandem, all of those trunks may not be necessary to handle this call. It may be feasible to loop the call through the tandem facility through a DAX or MUX (multiplexer) without going through the switch itself. This will appear as a direct connection. The analysis of the invention will provide the data and high level analysis mechanism to provide concise reports to study this situation.

From a basic standpoint it will take the total number of offices subtending the tandem and rank those offices to show which are making the most use of the tandem. This may involve analysis of three sets of CCIS signaling: the signaling from the originating office to the tandem, the signaling from the tandem to the terminating office, and the original signaling from the original office to the terminating office to determine availability of the dialed terminal. All of this data can be captured from the A link signaling and is subject to the high level analysis in the high level OLAP object oriented transactional processor illustrated at 80. This provides information to indicate the most economical and efficient solution to the problem. The solution may involve the provision of additional direct trunks, and in such a situation will provide information to indicate the particular end offices which should be linked. Alternately, or conjunctively, this may indicate that more trunk paths are desirable through the tandem. The analysis will also provide direction as to additional analysis and collection of specific data from designated A links to provide an optimum solution.

For traffic track studies of tandems and associated trunk utilization, the traffic tracking system implements a study model based principally on monitoring of SS7 messages. The model includes specific data preparation. As noted above, one type of data preparation relates to conversion of point codes and/or NPA/NXXs and converting them to switches and subsequent tabulation of records by the identified switch. For the tandem study, the SS7 CDRs are prepared in this manner to identify the tandem as either the terminating or originating office and to tabulate traffic so as to identify offices originating and receiving calls through the tandem. The preparation for the tandem study model also produces office summary and office pair summary tables, as discussed above.

As a result, the SS7 CDR data provides the following information:
  a) Identification of Originating Usage (Minutes/CCS) by Subtending Central Office (Office CLLI code) and Trunk Identifier;
  b) Rank Order of highest originating usage subtending offices in a study period (24 hrs., 2 days, 5 days, etc.,);
  c) Rank Order of Highest originating usage by Trunk Identifier;
  d) Identification of a Busy Hour for all traffic originating to the tandem;
  e) Identification of unique busy hours for "High Usage" subtending offices; and
  f) Rank Order of highest point-to-point, originating-to-terminating subtending offices in a study period.

In a preferred implementation, there are two tandem study configurations. The basic study configuration captures traffic/CDR's originating and terminating to the Access Tandem from serving subtending offices. An enhanced study configuration captures all subtending office traffic and traffic/CDR's originating and terminating to other Access Tandems, or IXC or CLEC Access Tandems.

The data analysis process for the preferred tandem study model includes the following steps:
  a) View all Originating Traffic to the Access Tandem for the individual day(s) of the study period;
  b) Identify the hour of the days in the study period that has the highest total Minutes of Use. Highlight this tandem busy hour in a unique fashion;
  c) Sort the call record by Originating NPA-NXX, Trunk ID and then by associated office CLLI Code;
  d) Save calls re cords that are unidentified with an originating office CLLI code into a location/file aggregated by NPA-NXX;
  e) Rank order daily by total MOU (Minutes of Use) for the originating CLLI Code, Trunk ID and NPA-NXX (top 50) and produce a standard report of these results;
  f) For the top 20. Office CLLI Codes and Trunk Identifiers, identify and graphically represent the unique busy hours for these entities and highlight the hour of the day that has the highest number of coincident Office busy hours;
  g) For the originating daily traffic from each of the top 20 usage Offices, sort the call records by terminating destination (i.e., called number); and
  h) Rank order by daily MOU the highest terminating destination CLLI Code, Trunk ID, and NPA-NXX, and produce a standard report of the highest MOU point-to-point traffic by originating to terminating Offices (CLLI Codes).

Those skilled in the art will recognize that the invention admits of a wide range of modifications, all of which fall within the spirit and scope of the inventive concepts. Several examples are discussed briefly below.

The traffic track technology described in detail above has applied to analysis of the actual call traffic through the PSTN. However, the technology may be applied as desired to analysis of traffic of elements of the SS7 signaling system. For example, the traffic track system may be used to analyze signaling traffic through specific STPs or to and from particular database systems (SCPs or the like). Also, the traffic track technology may be adapted to study other types of telecommunication networks, such as cell or packet data networks, cellular networks, etc.

As described above, the SS7 monitoring traps messages from identified links going to and from the STPs. Other forms of monitoring of the interoffice signaling fall within the scope of the invention. For example, the function of the site processors might be rolled up into processor functions on the card cages. Also, a number of STP vendors have products that can supply message copies to monitoring ports, such that the STP itself performs the trapping function.

From the foregoing it may be seen that the system and methodology of the invention provide a powerful and flexible tool for performing varying investigations and surveillance. Thus, as examples, it is feasible to identify ISPs, determine the source of the largest amount of traffic to the identified ISPs, the reason for overloading, the optimal solution to the overloading. It is also possible to analyze tandem loading and overloading, determine the largest causes of that overloading, and provide a ranking of potential solutions to discovered problems.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of conducting a study for analyzing traffic through a telecommunication network, comprising the steps of:
   compiling detail records for a predetermined set of calls processed through the telecommunication network, wherein calls of the predetermined set are identified by parameters of the study;
   loading the detail records into files in a database;
   processing the files in the database to enrich the information of the detail records in a manner facilitating the study;
   uploading the enriched information to an on-line analytical processing routine supporting interactive analysis for one or more users; and
   executing an application corresponding to the study, to present study results, the application including said interactive analysis based at least in part on the enriched information.

2. A method according to claim 1 wherein the step of compiling detail records comprises:
   monitoring signaling messages regarding call processing exchanged between offices of the telecommunication network; and
   processing a plurality of the signaling messages regarding each call satisfying the parameters of the study to form a call detail record of significant data regarding the call.

3. A method according to claim 2, wherein:
   offices of the telecommunication network generate accounting messages regarding calls through the offices; and
   the step of compiling detail records further comprises processing a plurality of the accounting messages regarding each call satisfying the parameters of the study to form a call detail record of significant data regarding the call.

4. A method according to claim 1, wherein:
   offices of the telecommunication network generate accounting messages regarding calls through the offices; and
   the step of compiling detail records comprises processing a plurality of the accounting messages regarding each call satisfying the parameters of the study to form a call detail record of significant data regarding the call.

5. A method according to claim 1, wherein the database comprises a relational database.

6. A method according to claim 5, wherein the on-line analytical processing routine comprises a multi-dimensional database.

7. A method according to claim 1, wherein the telecommunication network comprises a switched telephone carrier network.

8. A method according to claim 7, wherein the switched telephone carrier network is a local exchange carrier (LEC) network.

9. A method according to claim 1, wherein:
   the parameters of the study identify calls through at least one specified office of the telecommunication network; and
   the application facilitates analysis of traffic patterns of calls through the at least one specified office.

10. A method according to claim 9, wherein the at least one specified office comprises a tandem office.

11. A method according to claim 9, wherein the at least one specified office comprises an end office.

12. A method according to claim 1, wherein the executing of the application includes supplementing the enriched information with external data.

13. A method according to claim 12, wherein the external data includes information relating to users of the telecommunication network.

14. A method according to claim 1, wherein the application provides a user interface to the study results in the on-line analytical processing routine.

15. A method according to claim 14, wherein the user interface comprises a web suite interface.

16. A method according to claim 14, wherein the user interface comprises a client-server interface.

17. A method according to claim 1, wherein the files in the database have a pre-defined format corresponding to the study.

18. A method according to claim 1, wherein:
   the study corresponds to a type of study selected from a plurality of predefined types of study; and
   the application comprises on application selected from a plurality of applications available in the on-line analytical processing routine, each of the plurality of applications corresponding to one of the predefined types of study and the selected application corresponding to the selected type of study.

19. A method according to claim 18, wherein the types of study include at least a tandem study, an Internet Service Provider (ISP) finder study and an Internet user study.

20. An apparatus, comprising:
   a plurality of network elements for providing selective call communication links for subscribers;
   means associated with the network elements for compiling detail records for a predetermined set of calls processed through one or more of the elements of the telecommunication network, wherein calls of the predetermined set are identified by parameters of a traffic study; and
   a server system, in communication with the means for compiling, the server system comprising:
   1) a landing zone routine;
   2) a relational database, wherein the landing zone routine loads the detail records into files in the relational database;
   3) a data preparation routine for processing the files in the relational database to enrich the information of the detail records in a manner facilitating the study;
   4) an on-line analytical processing routine receiving the enriched information, the on-line analytical processing routine supporting interactive analysis for one or more users; and 5) at least one application corresponding to the study, for presenting study results, the application including said interactive analysis based at least in part on the enriched information.

21. An apparatus as in claim 20, wherein the telecommunication network comprises a switched telephone network.

22. An apparatus as in claim 21, wherein:
the switched telephone network comprises a plurality of switching offices and an interoffice signaling network; and
the means for compiling comprises a system for monitoring signaling messages regarding call processing exchanged between switching offices over the interoffice signaling network and processing a plurality of the signaling messages regarding each call satisfying the parameters of the study to form a call detail record of significant data regarding the call.

23. An apparatus as in claim 21, wherein:
the switched telephone network comprises a plurality of switching offices, each switching office generating accounting messages regarding calls processed through the switching office; and
the means for compiling comprises a system for processing a plurality of the accounting messages regarding each call satisfying the parameters of the study to form a call detail record of significant data regarding the call.

24. An apparatus as in claim 23, wherein the system for processing comprises a billing system of the switched telephone network.

25. An apparatus as in claim 20, wherein the on-line analytical processing routine comprises a multidimensional database.

26. A method according to claim 20, wherein the on-line analytical processing routine provides a client-server or web, suite user interface.

27. A traffic tracking system, for conducting studies of traffic through a telecommunication network, comprising:
a database for receiving and storing detail records of selected calls processed through the network;
a data preparation routine operating on files in the database for enriching the detail records in a predetermined manner corresponding to a running study;
an on-line analytical processing routine receiving the enriched detail records from the data preparation routine, the on-line analytical processing routine supporting interactive analysis for one or more users; and
an application including said interactive analysis based at least in part on the enriched call detail records, wherein the application is associated with the running study.

28. A traffic tracking system as in claim 27, wherein the database comprises a relational database having at least one predefined table corresponding to the running study for receiving the detail records from the telecommunication network.

29. A traffic tracking system as in claim 28, wherein the on-line analytical processing routine comprises a multi-dimensional database.

30. A traffic tracking system as in claim 29, wherein the application provides a web suite user interface for access and processing of the enriched information in the multi-dimensional database.

31. A traffic tracking system as in claim 27, wherein the database comprises:
a first relational database for receiving detail records of calls compiled from interoffice signaling of the telecommunication network; and
a second relational database for receiving detail records of calls from, a billing system of the telecommunication network.

* * * * *